(12) United States Patent
Jiang et al.

(10) Patent No.: US 11,760,953 B2
(45) Date of Patent: Sep. 19, 2023

(54) MULTIFUNCTIONAL BRANCHED POLYMERS WITH IMPROVED LOW-TEMPERATURE PERFORMANCE

(71) Applicant: Afton Chemical Corporation, Richmond, VA (US)

(72) Inventors: Sheng Jiang, Glen Allen, VA (US); Arturo Carranza, Henrico, VA (US)

(73) Assignee: AFTON Chemical Corporation, Richmond, VA (US)

( * ) Notice: Subject to any disclaimer, the term of this patent is extended or adjusted under 35 U.S.C. 154(b) by 97 days.

(21) Appl. No.: 17/376,604

(22) Filed: Jul. 15, 2021

(65) Prior Publication Data
US 2021/0340458 A1    Nov. 4, 2021

Related U.S. Application Data

(62) Division of application No. 15/961,971, filed on Apr. 25, 2018, now Pat. No. 11,098,262.

(51) Int. Cl.
*C10M 161/00* (2006.01)
*C10M 129/06* (2006.01)
(Continued)

(52) U.S. Cl.
CPC ........ *C10M 161/00* (2013.01); *C10M 129/06* (2013.01); *C10M 133/06* (2013.01);
(Continued)

(58) Field of Classification Search
CPC .............. C10M 161/00; C10M 129/06; C10M 133/06; C10M 143/02; C10M 145/04;
(Continued)

(56) References Cited

U.S. PATENT DOCUMENTS 3,178,663 A    4/1965  Kahn
3,185,647 A    5/1965  Anderson et al.
(Continued)

FOREIGN PATENT DOCUMENTS

CA    2399753 A1    2/2004
CN    1089300 A     7/1994
(Continued)

OTHER PUBLICATIONS

Second Office Action for corresponding Chinese application No. 201910327553.0; dated Apr. 24, 2022 (16 pages).
(Continued)

*Primary Examiner* — Prem C Singh
*Assistant Examiner* — Francis C Campanell
(74) *Attorney, Agent, or Firm* — Mendelsohn Dunleavy, PC

(57) ABSTRACT

A viscosity index improver comprising a reaction product of (i) an acylated copolymer obtainable by acylating a copolymer of ethylene and one or more $C_3$-$C_{10}$ alpha-olefins having an Mn of 3,000 to 250,000 g/mol; and (ii) a compound of the formulae (III)-(V):

(Continued)

-continued

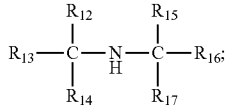

wherein $R_6$, $R_8$, $R_9$, $R_{10}$, $R_{12}$ and $R_{15}$ are independently selected from a hydrogen and an optionally substituted linear or branched alkyl or alkenyl group, and $R_7$, $R_{11}$, $R_{13}$, $R_{14}$, $R_{16}$, and $R_{17}$ are independent selected from an optionally substituted linear or branched alkyl or alkenyl group, and a sum of the number of carbon atoms in each compound of the formulae (III)-(V) is from 6 to 31.

29 Claims, 4 Drawing Sheets

(51) Int. Cl.
  C10M 133/06  (2006.01)
  C10M 143/02  (2006.01)
  C10M 145/04  (2006.01)
  C10N 30/02   (2006.01)
  C10N 40/25   (2006.01)
(52) U.S. Cl.
  CPC ........ C10M 143/02 (2013.01); C10M 145/04 (2013.01); C10M 2205/022 (2013.01); C10M 2207/021 (2013.01); C10M 2209/04 (2013.01); C10M 2215/04 (2013.01); C10N 2030/02 (2013.01); C10N 2040/25 (2013.01)
(58) Field of Classification Search
  CPC ...... C10M 2205/022; C10M 2207/021; C10M 2209/04; C10M 2215/04; C10M 2209/086; C10M 149/06; C10M 2217/06; C10N 2030/02; C10N 2040/25; C10N 2020/02; C10N 2030/06; C10N 2030/08; C10N 2020/04; C10N 2040/02; C08F 8/32; C08F 8/14
  USPC ......................................... 508/545, 200, 547
  See application file for complete search history.

(56) References Cited

U.S. PATENT DOCUMENTS

| | | |
|---|---|---|
| 3,189,544 A | 6/1965 | Ratner et al. |
| 3,256,185 A | 6/1966 | Le Suer |
| 3,278,550 A | 10/1966 | Norman et al. |
| 3,312,619 A | 4/1967 | Vineyard |
| 3,366,569 A | 1/1968 | Norman et al. |
| 3,390,086 A | 6/1968 | O'Halloran |
| 3,403,102 A | 9/1968 | Le Suer |
| 3,458,530 A | 7/1969 | Siegel et al. |
| 3,470,098 A | 9/1969 | O'Halloran |
| 3,502,677 A | 3/1970 | Le Suer |
| 3,519,564 A | 7/1970 | Vogel |
| 3,546,243 A | 12/1970 | Coupland |
| 3,573,205 A | 3/1971 | Lowe et al. |
| 3,634,515 A | 1/1972 | Piasek |
| 3,649,229 A | 3/1972 | Otto |
| 3,654,370 A | 4/1972 | Yeakey |
| 3,708,522 A | 1/1973 | LeSuer |
| 3,718,663 A | 2/1973 | Piasek et al. |
| 3,749,695 A | 7/1973 | de Vries |
| 3,859,318 A | 1/1975 | Lesuer |
| 3,865,740 A | 2/1975 | Goldschmidt |
| 3,865,813 A | 2/1975 | Gergel |
| 3,954,639 A | 4/1976 | Liston |
| 4,152,353 A | 5/1979 | Habermann |
| 4,152,499 A | 5/1979 | Boerzel et al. |
| 4,160,739 A | 7/1979 | Stambaugh et al. |
| 4,234,435 A | 11/1980 | Meinhardt et al. |
| 4,259,194 A | 3/1981 | de Vries et al. |
| 4,259,195 A | 3/1981 | King et al. |
| 4,261,843 A | 4/1981 | King et al. |
| 4,263,152 A | 4/1981 | King et al. |
| 4,265,773 A | 5/1981 | deVries et al. |
| 4,272,387 A | 6/1981 | King et al. |
| 4,283,295 A | 8/1981 | deVries et al. |
| 4,285,822 A | 8/1981 | deVries et al. |
| 4,340,689 A | 7/1982 | Joffrion |
| 4,379,064 A | 4/1983 | Cengel et al. |
| 4,482,464 A | 11/1984 | Karol et al. |
| 4,521,318 A | 6/1985 | Karol |
| 4,554,086 A | 11/1985 | Karol et al. |
| 4,579,675 A | 4/1986 | Sawicki et al. |
| 4,612,132 A | 9/1986 | Wollenberg et al. |
| 4,614,522 A | 9/1986 | Buckley |
| 4,614,603 A | 9/1986 | Wollenberg |
| 4,617,137 A | 10/1986 | Plavac |
| 4,617,138 A | 10/1986 | Wollenberg |
| 4,618,717 A | 10/1986 | Renken et al. |
| 4,636,322 A | 1/1987 | Nalsnik |
| 4,645,515 A | 2/1987 | Wollenberg |
| 4,646,860 A | 3/1987 | Owens et al. |
| 4,647,390 A | 3/1987 | Buckley, III et al. |
| 4,648,886 A | 3/1987 | Buckley, III et al. |
| 4,648,980 A | 3/1987 | Erdman |
| 4,652,387 A | 3/1987 | Andress, Jr. et al. |
| 4,663,062 A | 5/1987 | Wollenberg |
| 4,663,064 A | 5/1987 | Nalesnick et al. |
| 4,666,459 A | 5/1987 | Wollenberg |
| 4,666,460 A | 5/1987 | Wollenberg |
| 4,668,246 A | 5/1987 | Wollenberg |
| 4,670,170 A | 6/1987 | Wollenberg |
| 4,670,515 A | 6/1987 | Olivier |
| 4,699,724 A | 10/1987 | Nalesnik et al. |
| 4,713,189 A | 12/1987 | Nalesnik et al. |
| 4,713,191 A | 12/1987 | Nalesnik |
| 4,735,736 A | 4/1988 | Chung |
| 4,766,245 A | 8/1988 | Larkin et al. |
| 4,857,214 A | 8/1989 | Papay et al. |
| 4,948,386 A | 8/1990 | Sung et al. |
| 4,960,942 A | 10/1990 | Gerkin et al. |
| 4,963,275 A | 10/1990 | Gutierrez et al. |
| 4,963,278 A | 10/1990 | Blain et al. |
| 4,971,598 A | 11/1990 | Andress et al. |
| 4,971,711 A | 11/1990 | Lundberg et al. |
| 4,973,412 A | 11/1990 | Migdal et al. |
| 4,973,761 A | 11/1990 | Schoenleben et al. |
| 4,978,842 A | 12/1990 | Hinton et al. |
| 4,981,492 A | 1/1991 | Blain et al. |
| 5,003,107 A | 3/1991 | Zimmerman et al. |
| 5,026,495 A | 6/1991 | Emert et al. |
| 5,030,249 A | 7/1991 | Herbstman et al. |
| 5,039,307 A | 8/1991 | Herbstman et al. |
| 5,075,383 A | 12/1991 | Migdal et al. |
| 5,128,056 A | 7/1992 | Gutierrez et al. |
| 5,204,012 A | 4/1993 | Schaffhausen |
| 5,229,022 A | 7/1993 | Song et al. |
| 5,241,003 A | 8/1993 | Degonia et al. |
| 5,266,223 A | 11/1993 | Song et al. |
| 5,334,321 A | 8/1994 | Harrison et al. |
| 5,352,835 A | 10/1994 | Dai et al. |
| 5,384,371 A | 1/1995 | Caines et al. |
| 5,422,042 A | 6/1995 | Waddill et al. |
| 5,427,702 A | 6/1995 | Chung et al. |
| 5,457,147 A | 10/1995 | McGrath et al. |
| 5,650,381 A | 7/1997 | Gatto et al. |
| 5,739,355 A | 4/1998 | Gateau et al. |
| 5,811,379 A * | 9/1998 | Rossi ............. C10L 10/14 585/12 |
| 5,883,057 A | 3/1999 | Roell, Jr. et al. |
| 6,034,040 A | 3/2000 | Ozbalik et al. |
| 6,107,207 A | 8/2000 | Waas et al. |
| 6,107,257 A | 8/2000 | Valcho et al. |
| 6,107,258 A | 8/2000 | Esche, Jr. et al. |

(56) References Cited

U.S. PATENT DOCUMENTS

| | | | |
|---|---|---|---|
| 6,127,481 | A | 10/2000 | Janssen et al. |
| RE37,363 | E | 9/2001 | Gatto et al. |
| 6,300,291 | B1 | 10/2001 | Hartley et al. |
| 6,548,458 | B2 | 4/2003 | Loper |
| 6,723,685 | B2 | 4/2004 | Hartley et al. |
| RE38,929 | E | 1/2006 | Gatto et al. |
| 7,214,649 | B2 | 5/2007 | Loper et al. |
| 7,253,231 | B2 | 8/2007 | Devlin et al. |
| RE40,595 | E | 12/2008 | Gatto et al. |
| 7,485,603 | B2 | 2/2009 | Bera et al. |
| 7,645,726 | B2 | 1/2010 | Loper et al. |
| 7,732,390 | B2 | 6/2010 | Kadkhodayan et al. |
| 7,786,057 | B2 | 8/2010 | Bera et al. |
| 7,897,696 | B2 | 3/2011 | Huang et al. |
| 8,048,831 | B2 | 11/2011 | Loper |
| 8,614,277 | B2 | 12/2013 | Kiss et al. |
| 8,999,905 | B2 | 4/2015 | Duggal |
| 9,441,063 | B2 | 9/2016 | Cruz et al. |
| 2003/0148897 | A1 | 8/2003 | Bell et al. |
| 2006/0025316 | A1 | 2/2006 | Covitch et al. |
| 2006/0128875 | A1 | 6/2006 | Bradley et al. |
| 2006/0173135 | A1* | 8/2006 | Devlin ............... C08F 255/00 525/242 |
| 2009/0143263 | A1 | 6/2009 | Bloch et al. |
| 2010/0107483 | A1 | 5/2010 | Thiel et al. |
| 2012/0101017 | A1 | 4/2012 | Duggal |
| 2012/0178659 | A1 | 7/2012 | Price et al. |
| 2012/0245063 | A1 | 9/2012 | DiBiase et al. |
| 2013/0172220 | A1 | 7/2013 | Ruhe, Jr. |
| 2014/0274842 | A1 | 9/2014 | McDougall et al. |
| 2014/0364349 | A1* | 12/2014 | Knapton ............ C10M 169/041 508/235 |
| 2016/0083667 | A1 | 3/2016 | Scherer et al. |

FOREIGN PATENT DOCUMENTS

| | | | |
|---|---|---|---|
| CN | 1155293 | A | 7/1997 |
| CN | 1172846 | A | 2/1998 |
| CN | 1214078 | A | 4/1999 |
| CN | 1214345 | A | 4/1999 |
| CN | 1422941 | A | 6/2003 |
| CN | 1786132 | A | 6/2006 |
| CN | 101007980 | A | 8/2007 |
| CN | 101031633 | A | 9/2007 |
| CN | 101451086 | A | 6/2009 |
| CN | 102482608 | A | 5/2012 |
| CN | 103748198 | A | 4/2014 |
| CN | 104903432 | A | 9/2015 |
| CN | 105229125 | A | 1/2016 |
| EP | 0515151 | A1 | 11/1992 |
| EP | 0612839 | A1 | 8/1994 |
| EP | 0816382 | A1 | 1/1998 |
| EP | 0909805 | A1 | 4/1999 |
| EP | 0914867 | A1 | 5/1999 |
| EP | 1717300 | A1 | 11/2006 |
| GB | 1065595 | | 4/1967 |
| GB | 1397994 | | 6/1975 |
| GB | 2140811 | A | 12/1984 |
| WO | 9406897 | A1 | 3/1994 |
| WO | 97/32946 | A1 | 9/1997 |
| WO | 2010014655 | A1 | 2/2010 |

OTHER PUBLICATIONS

Office Action for corresponding Canadian application No. 3,040,949; dated Jul. 14, 2022 (5 pages).
First Office Action for corresponding Chinese application No. 202110792920.1; dated Mar. 21, 2022 (9 pages).
Zhou, Shuang, et al. "Linear alpha-olefins and application thereof." Chemical Engineer 6 (1994): 34-36 (Machine Translation).
Notification of the Decision to Grant for corresponding Chinese application No. 202110792920.1; dated Sep. 20, 2022 (10 pages).
First Office Action for corresponding Chinese application No. 201910327553.0; dated Jan. 21, 2022 (8 pages).
Zhang, Xue-tao, et al. "Synthesis of Hydrogenated Butadiene Isoprene Copolymers as Viscosity Index Improvers for Low Temperature Hydraulic Oil." Hydraulics Pneumatics and Seals, Issue 3. doi: 10.3969/j.issn.1008-0813.2016.03.019 (2016): 58-62 (English Abstract).
Hansen, E. W., et al., "Improvement in the determination of triad distributions in ethylene-propylene copolymers by 13C nuclear magnetic resonance." Polymer 37.1 (1996): 19-24.
"Jeffamine M-600 Polyetheramine," Technical Bulletin, Huntsman, as retrieved on Dec. 8, 2017 from: http://www.huntsman.com/portal/page/portal/2FF4FB17BA053529E053DA6BEBCD630F.
"Maleic Anhydride Grafted—Ethylene Propylene Rubbers." Product Safety Assessment, Huntsman, 2015, as retrieved from: http://www.lanxess4you.com/.../Maleic%20Anhydride%20Grafted%20Ethylene%20Propylene%2 . . . .
Extended European Search Report for corresponding European Application No. 19170693.6; dated Oct. 24, 2019; (8 pages).

* cited by examiner

MULTIFUNCTIONAL BRANCHED POLYMERS WITH IMPROVED LOW-TEMPERATURE PERFORMANCE

FIELD OF THE INVENTION

The invention relates to a multi-functional olefin copolymer viscosity index improver and a lubricating oil composition. A lubricating oil composition comprising the multifunctional olefin copolymer viscosity index improver may provide improved thin film friction and one or more of improved viscometric parameters including improved low temperature performance, as determined in a cold crank simulator.

BACKGROUND OF THE INVENTION

Viscosity index improvers are an important component of lubricating oil compositions as they are required to improve the finished oil performance and to meet SAE multi-grade viscosity standards. Functional polymers add the possibility of reducing the amount of Group III trim oil due to their ability to modify the viscometrics and aid in tribological performance. Ethylene alpha olefin copolymers are versatile and may be chemically modified for various purposes.

By introducing nonpolar chains to a polymer backbone, using reactive moieties such as alcohols and amines, the viscometric performance can be adjusted to affect one or more of treat rate, high temperature high shear viscosity, and low temperature performance, as well as frictional properties which could contribute to improved engine performance and extended engine oil longevity. In general, amines containing a long linear hydrocarbon chain or the corresponding alcohols, when attached as side chains on an alpha-olefin backbone, could provide improved viscometrics when used as a viscosity modifier in engine oils. However, it is desirable to provide a viscosity index improver capable of delivering both viscometric and one or more friction properties.

U.S. Pat. No. 5,229,022 discloses a dispersant prepared from grafted olefin polymers. Specifically, the olefin polymers are ethylene alpha-olefins reacted with a monounsaturated carboxylic reactant and further reacted with a nucleophilic compound, for example an amine, alcohol, polyol, amino alcohol or reactive metal compounds. Preferably, the grafted polymers are prepared with polyamines having from 3 to 12 nitrogen atoms.

U.S. Pat. No. 4,160,739 discloses graft copolymers prepared from maleic anhydride and an olefin copolymer reacted with a polyamino compound having one reactive primary or secondary amino group.

SUMMARY OF THE INVENTION

In a first aspect, the invention relates to a viscosity index improver that includes a reaction product of:
(i) an acylated copolymer obtainable by acylating, with an acylating agent, a copolymer of ethylene and one or more $C_3$-$C_{10}$ alpha-olefins having a number average molecular weight of 3,000 to 250,000 g/mol as measured by GPC; and (ii) a compound selected from one or more compounds of the formulae (III)-(V):

(III)

wherein $R_6$ is selected from a hydrogen and an optionally substituted linear or branched alkyl or alkenyl group, and $R_7$ is an optionally substituted linear or branched alkyl or alkenyl group, and a sum of a number of carbon atoms of $R_6$ and $R_7$ is from 7 to 31;

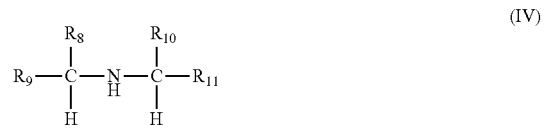

(IV)

wherein $R_8$, $R_9$ and $R_{10}$ are independently selected from a hydrogen and an optionally substituted linear or branched alkyl or alkenyl group; and $R_{11}$ is selected from an optionally substituted linear or branched alkyl or alkenyl group, and a sum of a number of carbon atoms of $R_8$, $R_9$, $R_{10}$ and $R_{11}$ is from 6 to 30; and

(V)

wherein $R_{13}$, $R_{14}$, $R_{16}$, and $R_{17}$ are independently selected from an optionally substituted linear or branched alkyl or alkenyl group; $R_{12}$ and $R_{15}$ are independently selected from hydrogen and an optionally substituted linear or branched alkyl or alkenyl group, a sum of a number of carbon atoms of $R_{12}$, $R_{13}$, $R_{14}$, $R_{15}$, $R_{16}$ and $R_{17}$ is from 6 to 30, and only one of $R_{12}$ and $R_{15}$ can be hydrogen; and the alkyl or alkenyl groups of the compounds of the formulae (I)-(V) are optionally substituted with one or more of halo groups, alkoxy groups, mercapto groups, nitro groups, nitroso groups, sulfoxy groups, pyridyl groups, furyl groups, thienyl groups, imidazolyl groups, and sulfur, and no more than two non-hydrocarbon substituents are present for every ten carbon atoms in the alkyl or alkenyl group.

In the foregoing embodiment, one or more of $R_7$, $R_{11}$, and $R_{13}$ may be an alkyl group or an alkenyl group that provides branching at one or more of an alpha and a beta carbon atom of the compound (ii), or one or more of $R_7$, $R_{11}$, and $R_{13}$ may be an alkyl group or an alkenyl group that provides branching at at least an alpha carbon atom of the compound (ii), or one or more of $R_7$, $R_{11}$, and $R_{13}$ may be an alkyl group or an alkenyl group that provides branching at least a beta carbon atom of the compound (ii).

In one embodiment, the compound (ii) may be a compound of the formula (III) and $R_6$ may be a linear or branched alkyl or alkenyl group.

In other embodiments, the compound (ii) may be a compound of the formula (IV), and $R_9$ and $R_{11}$ are independently selected from a branched alkyl group and a branched alkenyl group.

In other embodiments, the compound (ii) may be a compound of the formula (V) and at least one of $R_{12}$, $R_{13}$, and $R_{14}$ may be a branched alkyl group or branched alkenyl group, and at least one of $R_{15}$, $R_{16}$, and $R_{17}$ may be a branched alkyl group or branched alkenyl group.

In each of the foregoing embodiments the at least one group that provides beta branching may be a $C_2$-$C_{17}$ alkyl or alkenyl group, and in this embodiment, the compound (ii) may be a primary amine.

In certain embodiments, the compound (ii) is a secondary amine and the at least one group that provides beta branching is a $C_8$-$C_{18}$ alkyl or alkenyl group.

In certain embodiments the compound (ii) is selected from 2-ethyl-1-hexylamine, 2-butyl-1-octylamine, 2-hexyl-1-decamine, 2-octyl-1-dodecylamine, 2-decyl-1-tetradecamine, 2-dodecyl-1-hexadecamine, and 2-tetradecyl-1-octadecamine.

In other embodiments, the compound (ii) may be selected from dioctylamine, 2-ethyl-1-hexylamine and bis(2-ethyl-1-hexyl)amine.

In other embodiments, the compound (ii) may be a compound of the Formulae (III)-(V) and one or more of $R_7$, $R_{11}$, and $R_{13}$ may be a linear alkyl group or a linear alkenyl group attached to provide branching at a β carbon atom of the compound (ii).

The compound (ii) may also be a mixture of any two or more compounds of the Formulae (I)-(V) or a mixture of two or more of any of the compounds of the foregoing embodiments.

In each of the foregoing embodiments, the acylating agent may be an ethylenically unsaturated acylating agent having at least one carboxylic acid or carboxylic anhydride group, or the acylating agent may be at least one selected from the group consisting of maleic acid, fumaric acid, itaconic acid, citraconic acid, cyclohex-4-ene-1,2-di-carboxylic acid, bicyclo[2.21]hept-5-ene-2,3-dicarboxylic acid, maleic anhydride, itaconic anhydride, citraconic anhydride, allylsuccinic anhydride, 4-methylcyclohex-4-ene-1,2-dicarboxylic anhydride and bicyclo[2.2.1]hept-5-ene-2,3-dicarboxylic anhydride, or the acylating agent may be maleic anhydride.

In each of the foregoing embodiments, the ratio of moles of amine and/or alcohol per mole of carboxyl groups of the acylated polymer, may be from 0.25:1 to 4:1 or from 0.5:1 to 2:1 or from 0.5:1 to 1:1, or more preferably from about 1:1.

In each of the foregoing embodiments, the acylated copolymer may have acyl groups present in an amount of 0.3 weight percent to less than 30 weight percent, based on a total weight of the acylated copolymer, or the acylated copolymer may have acyl groups present in an amount of 0.5 weight percent to less than 10 weight percent, or the acylated copolymer may have acyl groups present in an amount of 0.5 to 5 wt. %.

In each of the foregoing embodiments, the acylated copolymer may have 0.1 to 0.8 acyl groups per 1000 number average molecular weight units of the ethylene/$C_3$-$C_{10}$ alpha-olefin copolymers.

In each of the foregoing embodiments, the ethylene content of the copolymer of ethylene and one or more $C_3$-$C_{10}$ alpha-olefins may be at least 10 mol % and less than 70 mol % and a $C_3$-$C_{10}$ alpha-olefin content of the copolymer of ethylene and one or more $C_3$-$C_{10}$ alpha-olefins may be at least 40 mol % of propylene.

In each of the foregoing embodiments, the copolymer of ethylene and one or more $C_3$-$C_{10}$ alpha-olefins may include propylene units.

In each of the foregoing embodiments, the copolymer of ethylene and one or more $C_3$-$C_{10}$ alpha-olefins may have a polydispersity index of less than or equal to 4.

In each of the foregoing embodiments, the copolymer may have an average ethylene derived unit run length ($n_{C2}$) which is less than 2.6, as determined by $^{13}C$ NMR spectroscopy, the average ethylene derived unit run length $n_{c2}$ is defined as the total number of ethylene-derived units in the copolymer divided by a number of runs of one or more sequential ethylene-derived units in the copolymer, and the average ethylene derived unit run length $n_{c2}$ also satisfies the relationship shown by the expression below:

$$n_{C2} < \frac{(EEE + EEA + AEA)}{(AEA + 0.5EEA)}$$

wherein
$EEE = (x_{C2})^3$
$EEA = 2(x_{C2})^2(1-x_{C2})$
$AEA = x_{C2}(1-x_{C2})^2$
$x_{C2}$ being a mole fraction of ethylene incorporated in the copolymer as measured by $^1H$-NMR spectroscopy, E representing an ethylene unit, and A representing a $C_3$-$C_{10}$ alpha olefin unit.

In each of the foregoing embodiments, less than 20% of unit triads in the copolymer may be ethylene-ethylene-ethylene triads.

In each of the foregoing embodiments, the average ethylene derived unit run length may be less than 2.4.

In another aspect, the invention relates to a lubricating oil composition. The lubricating oil composition includes:
greater than 50 wt. % of a base oil, based on the total weight of the lubricating oil composition, and
0.1 wt. % to 20 wt. %, based on the total weight of the lubricating oil composition, of a viscosity index improver as claimed in claim 1.

In each of the foregoing embodiments, the lubricating oil composition may be an engine oil composition.

In another aspect, the invention relates to a method for improving thin film friction in an engine. In the method the engine is lubricated with an engine oil composition that may contain any of the foregoing viscosity index improvers. The thin film friction may be determined by measuring traction coefficients using a mini-traction machine at 130° C. with an applied load of 50N between an ANSI 52100 steel disk and an ANSI 52100 steel ball as oil was being pulled through the contact zone at an entrainment speed of 500 mm/s while maintaining a slide-to-roll ratio of 50% between the ball and disk during the measurements. In the foregoing method, the improved thin film friction may be determined relative to a similar composition that contains conventional an olefin copolymer viscosity index improver without any modification.

In another aspect, the invention relates to a method for improving low temperature performance in an engine as determined according to the method of ASTM D5293. In the method the engine is lubricated with an engine oil composition that may contain any of the foregoing viscosity index improvers.

In each of the foregoing methods, the engine oil composition and/or the crankcase oil composition may be suitable for lubrication of at least the pistons, rings, cylinders, bearings and crankshafts of an engine crankcase.

Additional details and advantages of the disclosure will be set forth in part in the description which follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DEFINITIONS

Figure 1:
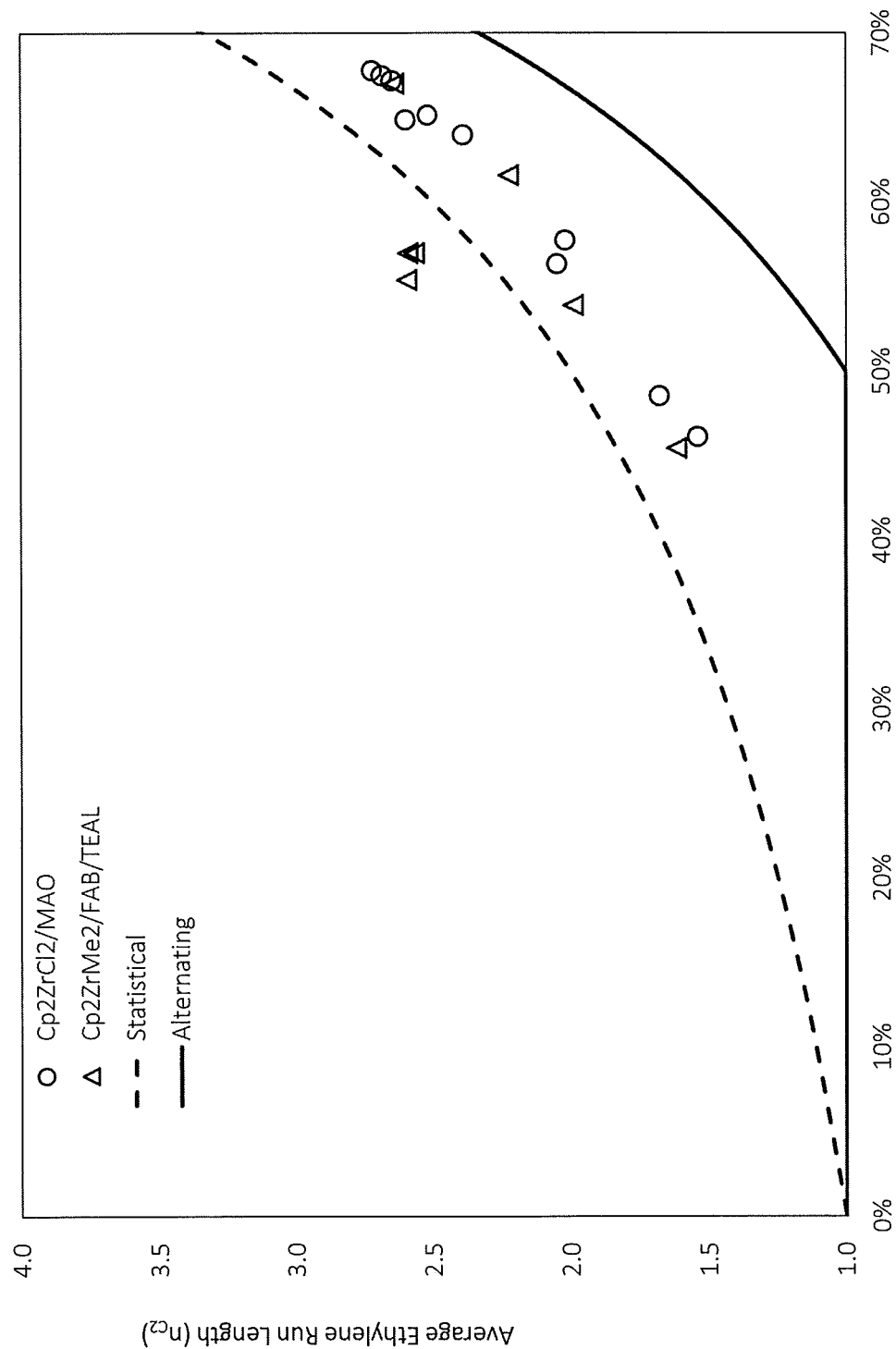
FIG. 1 is a graphical representation of the comparison of average ethylene run length to purely statistical and alternating microstructures at different ethylene incorporations for C2/C3 copolymers, according to one or more embodiments.

The following definitions of terms are provided in order to clarify the meanings of certain terms as used herein.

The terms "oil composition," "lubrication composition," "lubricating oil composition," "lubricating oil," "lubricant composition," "lubricating composition," "fully formulated lubricant composition," and "lubricant," are considered synonymous, fully interchangeable terminology referring to the finished lubrication product comprising a major amount of a base oil plus a minor amount of an additive composition.

The terms "crankcase oil," "crankcase lubricant," "engine oil," "engine lubricant," "motor oil," and "motor lubricant" refer to oil compositions as defined above which are suitable for use as a lubricant in the device referenced in each term, e.g. crankcase, engine and motor.

As used herein, the terms "additive package," "additive concentrate," and "additive composition," are considered synonymous, fully interchangeable terminology referring the portion of the lubricating oil composition excluding the major amount of base oil stock mixture.

As used herein, the terms "engine oil additive package," "engine oil additive concentrate," "crankcase additive package," "crankcase additive concentrate," "motor oil additive package," "motor oil concentrate," refer to additive packages as defined above which are suitable for use in formulating a lubricant for use in the device referenced in each term, e.g. crankcase, engine and motor.

The term "overbased" relates to metal salts, such as metal salts of sulfonates, carboxylates, salicylates, and/or phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, MR, is greater than one. They are commonly referred to as overbased, hyperbased, or superbased salts and may be salts of organic sulfur acids, carboxylic acids, salicylates, and/or phenols.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Each hydrocarbyl group is independently selected from hydrocarbon substituents, and substituted hydrocarbon substituents containing one or more of halo groups, hydroxyl groups, alkoxy groups, mercapto groups, nitro groups, nitroso groups, amino groups, sulfoxy groups, pyridyl groups, furyl groups, thienyl groups, imidazolyl groups, sulfur, oxygen and nitrogen, and wherein no more than two non-hydrocarbon substituents are present for every ten carbon atoms in the hydrocarbyl group.

As used herein, the term "percent by weight", unless expressly stated otherwise, means the percentage the recited component represents to the total weight of the entire composition.

The terms "soluble," "oil-soluble," or "dispersible" used herein may, but does not necessarily, indicate that the compounds or additives are soluble, dissolvable, miscible, or capable of being suspended in the oil in all proportions. The foregoing terms do mean, however, that they are, for instance, soluble, suspendable, dissolvable, or stably dispersible in oil to an extent sufficient to exert their intended effect in the environment in which the oil is employed. Moreover, the additional incorporation of other additives may also permit incorporation of higher levels of a particular additive, if desired.

The term "TBN" as employed herein is used to denote the Total Base Number in mg KOH/g as measured by the method of ASTM D2896.

The term "alkyl" as employed herein refers to straight, branched, cyclic, and/or substituted saturated chain moieties of from about 1 to about 100 carbon atoms; or 1, 2, 3, 4, 5, 6, 7, or 8 to 16, 17, 18, 20, 32, 40, 50, 60 or 100 carbon atoms. Examples include methyl, ethyl, propyl, isopropyl, butyl, sec-butyl, tert-butyl, pentyl, isopentyl, neopentyl, tert-pentyl, 1-methylbutyl, 2-methylbutyl, 3-methylbutyl, hexyl, isohexyl, and the like.

The term "alkenyl" as employed herein refers to straight, branched, cyclic, and/or substituted unsaturated chain moieties of from about 2 to about 100 carbon atoms; or 2, 3, 4, 5, 6, 7, or 8 to 16, 17, 18, 20, 32, 40, 50, 60 or 100 carbon atoms.

The term "aryl" as employed herein refers to single and multi-ring aromatic compounds that may include alkyl, alkenyl, alkylaryl, amino, hydroxyl, alkoxy, halo substituents, and/or heteroatoms including, but not limited to, nitrogen, oxygen, and sulfur.

When a polymer or copolymer is referred to as comprising an ethylene unit or an olefin unit, the ethylene unit or olefin unit present in the polymer or copolymer is the polymerized or oligomerized form of the ethylene or olefin, respectively. The term, "polymer" is meant to encompass homopolymers and copolymers. The term, "copolymer" includes any polymer having two or more units from different monomers, and encompasses random copolymers, statistical copolymers, interpolymers, and block copolymers. When a copolymer is said to comprise a certain percentage of an ethylene or olefin unit, that percentage is based on the total number of units in the copolymer.

A "polyolefin" is a polymer comprising at least 50 mol % of one or more olefin monomers. Preferably, a polyolefin comprises at least 60 mol %, or at least 70 mol %, or at least 80 mol %, or at least 90 mol %, or at least 95 mol %, or 100 mol % of one or more olefin monomers. Preferably, the olefin monomers are selected from $C_2$ to $C_{10}$ olefins. More preferably the olefin monomers are selected from ethylene, propylene, 1-butene, 1-hexene, and 1-octene. Polyolefins may also comprise up to 50 mol % of one or more diene monomers.

The nomenclature "$C_x$" where x is an integer means there are "x carbons" in the compound; for example, a "$C_5$ alpha-olefin" is an alpha-olefin with 5 carbon atoms.

For purpose of this invention and the claims thereto, unless otherwise noted, physical and chemical properties described herein are measured using the test methods described in the Experimental Methods section.

DETAILED DESCRIPTION OF EMBODIMENTS OF THE INVENTION

Disclosed herein is a viscosity index improver comprising a reaction product of:
i) an acylated copolymer obtainable by acylating, with an acylating agent, a copolymer of ethylene and one or more $C_3$-$C_{10}$ alpha-olefins having a number average molecular weight of 3,000 to 250,000 g/mol as measured by GPC; and
ii) a compound selected from one or more compounds of the formulae (III)-(V):

(III)

wherein $R_6$ is selected from a hydrogen and an optionally substituted linear or branched alkyl or alkenyl group, and $R_7$ is an optionally substituted linear or branched alkyl or alkenyl group, and a sum of a number of carbon atoms of $R_6$ and $R_7$ is from 7 to 31;

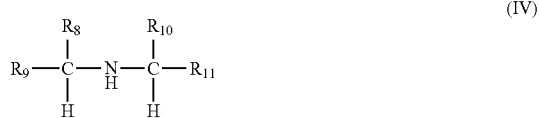

(IV)

wherein $R_8$, $R_9$ and $R_{10}$ are independently selected from a hydrogen and an optionally substituted linear or branched alkyl or alkenyl group; and $R_{11}$ is selected from an optionally substituted linear or branched alkyl or alkenyl group, and a sum of a number of carbon atoms of $R_8$, $R_9$, $R_{10}$ and $R_{11}$ is from 6 to 30; and

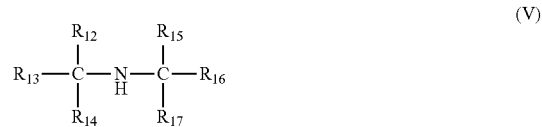

(V)

wherein $R_{13}$, $R_{14}$, $R_{16}$, and $R_{17}$ are independently selected from an optionally substituted linear or branched alkyl or alkenyl group; $R_{12}$ and $R_{15}$ are independently selected from hydrogen and an optionally substituted linear or branched alkyl or alkenyl group, a sum of a number of carbon atoms of $R_{12}$, $R_{13}$, $R_{14}$, $R_{15}$, $R_{16}$ and $R_{17}$ is from 6 to 30, and only one of $R_{12}$ and $R_{15}$ can be hydrogen; and
the alkyl or alkenyl groups of the compounds of the formulae (I)-(V) are optionally substituted with one or more of halo groups, alkoxy groups, mercapto groups, nitro groups, nitroso groups, sulfoxy groups, pyridyl groups, furyl groups, thienyl groups, imidazolyl groups, and sulfur, and no more than two non-hydrocarbon substituents are present for every ten carbon atoms in the alkyl or alkenyl group.

In another aspect of the invention, the disclosure relates to a lubricating oil comprising greater than 50 wt. % of a base oil and the foregoing viscosity index improver.

Various embodiments will now be described in greater detail below, including specific embodiments, versions and examples. The disclosure not limited to these embodiments, versions or examples, which are included to enable a person having ordinary skill in the art to make and use the invention when the information in this patent is combined with available information and technology.

Reaction Product of at Least One Compound of Formulae (I)-(V) with an Acylated Copolymer The described viscosity index improver is the reaction product of an acylated compolymer with an alcohol or amine as described herein. The reaction product of the present disclosure can be prepared by the reaction of a compound selected from an alcohol represented by Formulae (I)-(II) and an amine or combination represented by Formulae (III)-(V), with at least one acylated copolymer as described herein. For example, a lubricating oil composition comprising the viscosity index improver may be prepared by heating and mixing the acylated copolymer to a temperature of 150° C. with a base oil to completely dissolve the acylated copolymer. Then, the mixture may be maintained at 120° C. overnight and then raised to 170° C. while adding the alcohol and/or amine for three hours. In the reaction, the ratio of moles of amine and/or alcohol per mole of carboxyl groups of the acylated polymer, is from 0.25:1 to 4:1 or from 0.5:1 to 2:1 or from 0.5:1 to 1:1, or more preferably from about 1:1. The amount of amine reacted with the acylated polymer, wherein the amine comprises a primary amino group is approximately one mole of amino groups per two carboxyl groups of the acylated polymer, approximately 1:2, with respect to reactive moieties.

The amines comprising a secondary amino group are preferred, as they demonstrate improved performance due to higher densities of reacted moieties.

Compounds of Formulae (III)-(V)—Amine Compounds

Suitable amines used to make the reaction product of the present disclosure may comprise primary or secondary amino groups. Preferably, the amines comprise 8 to 32 carbon atoms with branching at the alpha carbon, or the beta carbon, or the gamma carbon, or the delta carbon, or the epsilon carbon, or mixtures thereof, relative to the nitrogen atom of the amino group.

For example, an amine with branching at the alpha (α) carbon, would be branched at the carbon atom directly bonded to the nitrogen atom of the amino group. Branching at the beta (β) carbon, would be branching at the second carbon counted from the nitrogen atom of the amino group, branching at the gamma (γ) carbon, would be branching at the third carbon counted from the nitrogen atom of the amino group, branching at the delta (δ) carbon would be branching at the fourth carbon counted from the nitrogen atom of the amino group and branching at the epsilon (ε) carbon, would be branching at the fifth carbon counted from the nitrogen atom of the amino group.

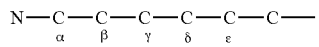

Amines of the present disclosure may be represented by the formulae (III)-(V). Formula (III) represents suitable primary amines:

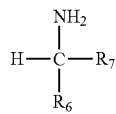

(III)

wherein $R_6$ is selected from a hydrogen and an optionally substituted linear or branched alkyl or alkenyl group; and $R_7$ is an optionally substituted linear or branched alkyl or alkenyl group wherein the number of carbon atoms of $R_6$ and $R_7$ add to a total of 7 to 31 carbon atoms. Preferably, $R_6$ is a hydrogen and $R_7$ is an optionally substituted linear alkyl or alkenyl group. More preferably, $R_6$ is a hydrogen and $R_7$ is an optionally substituted linear alkyl or alkenyl group wherein the carbon of said linear alkyl or alkenyl group which is bonded to the alpha carbon is also bonded to two other carbons in said linear alkyl or alkenyl group. Preferably, amine compounds of the formula (III) include branching at the β carbon. Examples of such amines include 2-ethyl-1-hexylamine, 2-butyl-1-octylamine, 2-hexyl-1-decamine, 2-octyl-1-dodecylamine, 2-decyl-1-tetradecamine, 2-dodecyl-1-hexadecamine, and 2-tetradecyl-1-octadecamine. Most preferably, the amine of the formula III is 2-ethyl-1-hexylamine.

In one aspect, $R_6$ and $R_7$ are both optionally substituted alkyl or alkenyl groups, wherein at least one alkyl or alkenyl group is linear.

In each of the foregoing embodiments, the amine compound of Formula (III) can comprise at least one branched alkyl or alkenyl group, wherein the location of the branching is selected from the group consisting of the β carbon, the γ carbon, the δ carbon, the ε carbon, and mixtures thereof. In the case of primary amines, the preferred amines are beta branched amines having one or two $C_2$-$C_{17}$ alkyl or alkenyl groups attached to the beta carbon atom. In the case of secondary amines, the preferred amines are beta branched amines having one or two $C_8$-$C_{18}$ alkyl or alkenyl groups attached to the beta carbon atom.

Formulae (IV) and (V) represent suitable secondary amines of the present invention:

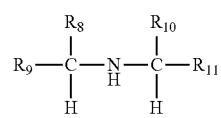

(IV)

wherein $R_8$, $R_9$ and $R_{10}$ are independently selected from a hydrogen and an optionally substituted linear or branched alkyl or alkenyl group; and $R_{11}$ is selected from an optionally substituted linear or branched alkyl or alkenyl group, wherein the number of carbon atoms of $R_8$, $R_9$, $R_{10}$ and $R_{11}$ add to a total of 6 to 30 carbon atoms. Preferably, the optionally substituted alkyl or alkenyl group of $R_{11}$ is an optionally substituted linear alkyl or alkenyl group wherein the carbon of said linear alkyl or alkenyl group which is bonded to the alpha carbon is also bonded to two other carbons in said linear alkyl or alkenyl group. Thus, the amine compounds of the formula (IV) can include branching at one or more of the β carbons (e.g., N,N-bis-(2-ethyl-n-hexyl)amine). In the case of primary amines, the preferred amines are beta branched amines wherein one or both of $R_8$ and $R_{10}$ is a $C_2$-$C_{17}$ alkyl or alkenyl group. In the case of secondary amines, the preferred amines are beta branched amines having one or two $C_8$-$C_{18}$ alkyl or alkenyl groups attached to the beta carbon atom. Preferred amines of this type are dioctylamine through dioctadecylamine and beta branched dioctylamines such as bis(2-ethyl) hexylamine. Preferably, these amines are symmetrical about the amine group.

In each of the foregoing embodiments, Formula (IV) can comprise at least one branched hydrocarbyl group, wherein the location of the branching is selected from the group consisting of the β carbon, the γ carbon, the δ carbon, the ε carbon, and mixtures thereof, relative to the nitrogen.

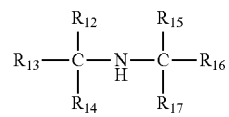

(V)

wherein $R_{13}$, $R_{14}$, $R_{16}$, and $R_{17}$ are independently selected from an optionally substituted linear or branched alkyl or alkenyl group; $R_{12}$ and $R_{15}$ are independently selected from hydrogen and an optionally substituted linear or branched alkyl or alkenyl group, wherein the number of carbon atoms of $R_{12}$, $R_{13}$, $R_{14}$, $R_{15}$, $R_{16}$ and $R_{17}$ add to a total of 6 to 30 carbon atoms, and wherein only one of $R_{12}$ and $R_{15}$ can be hydrogen. Preferably, at least $R_{13}$ is an optionally substituted linear alkyl or alkenyl group wherein the carbon of said linear alkyl or alkenyl group which is bonded to the alpha carbon is also bonded to two other carbons in said linear alkyl or alkenyl group. In other words, the amine compound of formula (V) can comprise a branch at the β carbon, relative to the nitrogen atom (e.g., N-(t-butyl)-N-(2-methyl-3-ethylhept-1-yl)amine).

In each of the foregoing embodiments, Formula (V) can comprise at least one branched hydrocarbyl group, wherein the location of the branching is selected from the group consisting of the α carbon, the β carbon, the γ carbon, the δ carbon, the ε carbon, and mixtures thereof, relative to the nitrogen.

In each of the foregoing embodiments, the optional substituent(s) for $R_6$-$R_{17}$ in formulae (III)-(V) may be one or more of halo groups, alkoxy groups, mercapto groups, nitro groups, nitroso groups, sulfoxy groups, pyridyl groups, furyl groups, thienyl groups, imidazolyl groups, and sulfur, and wherein no more than two non-hydrocarbon substituents are present for every ten carbon atoms in the alkyl or alkenyl group.

Particularly suitable amines are illustrated by the following non-limiting examples, 2-octanamine, 2-ethylhexamine, N,N-bis-(2-ethyl-n-hexyl)amine, N-(t-butyl)-N-(2-methyl-3-ethylhept-1-yl)amine, tetradecan-3-amine, 3-octanamine, 1-hexylheptylamine, 1-heptyloctylamine, decan-3-amine, 1-methyldecylamine, 2-dodecanamine, 1-methyldodecylaniine, 1-pentylhexylamine, 2-nonylamine, N-methyl-N-nonylamine, 2-decylamine, 2-octanamine, dioctylamine, dinonylamine, didecylamine, diundecylamine, didodecylamine, ditridecylamine, and ditetradecylamine through dioctadecylamine. Preferably, the branching groups of the amines of the formula V are one or two $C_8$-$C_{18}$ alkyl or alkenyl groups. The branching groups are preferably attached to the beta carbon atom. More preferably, the amine is selected from dioctylamine, 2-ethyl-1-hexylamine, and bis(2-ethyl-1-hexyl) amine.

Acylating Agent

According to one or more embodiments, the ethylene alpha-olefin copolymer described herein is acylated. The ethylene/$C_3$-$C_{10}$ alpha-olefin copolymers can be functionalized by incorporating at least one functional group in the copolymer structure. Exemplary functional groups may be incorporated by grafting, for example, ethylenically unsaturated mono- and di-functional carboxylic acids, ethylenically unsaturated mono- and di-functional carboxylic acid anhydrides, salts thereof and esters thereof and epoxy-group containing esters of unsaturated carboxylic acids onto the ethylene/$C_3$-$C_{10}$ alpha-olefin copolymers. Such functional groups may be incorporated into the copolymer by reaction with some or all of the unsaturation in the copolymer. Typically, the functional group will be an acyl group.

Examples of the unsaturated carboxylic acids, dicarboxylic acids which may be used to make the acylated copolymer are those having about 3 to about 20 carbon atoms per molecule such as acrylic acid, methacrylic acid, cinnamic acid, crotonic acid, maleic acid, fumaric acid and itaconic acid. More preferably, the carboxylic reactants are selected from the group consisting of maleic acid, fumaric acid, maleic anhydride, or a mixture of two or more of these. Unsaturated dicarboxylic acids having about 4 to about 10 carbon atoms per molecule and anhydrides thereof are especially preferred. Compounds that can be reacted with the unsaturation in the ethylene/$C_3$-$C_{10}$ alpha-olefin copolymers include for example, maleic acid, fumaric acid, itaconic acid, citraconic acid, cyclohex-4-ene-1,2-di-carboxylic acid, bicyclo[2.21]hept-5-ene-2,3-dicarboxylic acid, maleic anhydride, itaconic anhydride, citraconic anhydride, allylsuccinic anhydride, 4-methylcyclohex-4-ene-1,2-dicarboxylic anhydride and bicyclo[2.2.1]hept-5-ene-2,3-dicarboxylic anhydride. One particularly useful functional group may be introduced using maleic anhydride.

The amount of the acyl group present in the acylated copolymer can vary. The acyl group can typically be present in an amount of at least about 0.3 weight percent, or at least 0.5 weight percent or at least 1.0 weight percent, preferably at least 1.5 weight percent, or at least 2.0 weight percent, or at least about 5 weight percent, or at least about 7 weight percent. The acyl group will typically be present in an amount less than about 40 weight percent, preferably less than about 30 weight percent, and more preferably less than about 25 weight percent, or less than about 10 weight percent and more preferably less than about 5 weight percent. Combinations of each of the above referenced end points to form ranges are also contemplated.

The ethylenically unsaturated carboxylic acid materials typically can provide one or two acyl groups per mole of reactant to the grafted polymer. For example, methyl methacrylate can provide one acyl group per molecule to the grafted polymer while maleic anhydride can provide two acyl groups per molecule to the grafted polymer.

The carboxylic reactant is reacted or grafted onto the ethylene/$C_3$-$C_{10}$ alpha-olefin copolymers in an amount to provide from about 0.1 to about 0.8 acyl groups per 1000 number average molecular weight units of the ethylene/$C_3$-$C_{10}$ alpha-olefin copolymers. As another example, the carboxylic reactant is reacted or grafted onto the prescribed ethylene/$C_3$-$C_{10}$ alpha-olefin copolymers in an amount to provide from about 0.15 to about 1.4 acyl groups per 1000 number average molecular weight units of the ethylene/$C_3$-$C_{10}$ alpha-olefin copolymers. As further example, the carboxylic reactant is reacted or grafted onto the ethylene/$C_3$-$C_{10}$ alpha-olefin copolymers in an amount to provide from about 0.3 to about 0.75 acyl groups per 1000 number average molecular weight units of the ethylene/$C_3$-$C_{10}$ alpha-olefin copolymers. As an even further example, the carboxylic reactant is reacted or grafted onto the ethylene/$C_3$-$C_{10}$ alpha-olefin copolymers in an amount to provide from about 0.3 to about 0.5 acyl groups per 1000 number average molecular weight units of the ethylene/$C_3$-$C_{10}$ alpha-olefin copolymers.

For example, a copolymer substrate with a Mn of 20,000 g/mol. may be reacted or grafted with 6 to 15 acyl groups per polymer chain or 3 to 7.5 moles of maleic anhydride per mole of copolymer. A copolymer with a Mn of 100,000 g/mol. may be reacted or grafted with 30 to 75 acyl groups per polymer chain or 15 to 37.5 moles of maleic anhydride per polymer chain.

The grafting reaction to form the acylated olefin copolymers is generally carried out with the aid of a free-radical initiator either in solution or in bulk, as in an extruder or intensive mixing device. In some cases, it may be economically desirable to carry out the grafting reaction in hexane as described in U.S. Pat. Nos. 4,340,689, 4,670,515 and 4,948,842. The resulting grafted copolymer is characterized by having carboxylic acid acyl functionalities randomly distributed within its structure.

In the bulk process for forming the acylated olefin copolymers, the olefin copolymer fed to rubber or plastic processing equipment such as an extruder, intensive mixer or masticator, heated to a temperature of 150° C. to 400° C. and the ethylenically unsaturated carboxylic acid reagent and free-radical initiator may then be separately co-fed to the molten polymer to effect grafting. The reaction is optionally carried out with mixing condition to effect shearing and grafting of the ethylene copolymers according to, for example, the method of U.S. Pat. No. 5,075,383. The processing equipment is generally purged with nitrogen to prevent oxidation of the polymer and to aid in venting unreacted reagents and byproducts of the grafting reaction. The residence time in the processing equipment is sufficient to provide for the desired degree of acylation and to allow for purification of the acylated copolymer via venting. Mineral or synthetic engine oil may optionally be added to the processing equipment after the venting stage to dissolve the acylated copolymer.

Other methods known in the art for effecting reaction of ethylene-olefin copolymers with ethylenically unsaturated carboxylic reagents are described, for example, in U.S. Pat. No. 6,107,257.

Ethylene Alpha Olefin Copolymers

The ethylene copolymers to be grafted in accordance with this invention contain from about 2 to about 98, preferably 30 to 80 wt. % of ethylene, and about 20 to 70, preferably 40 to 60, wt. % of one or more $C_3$ to Cis, preferably $C_3$ to $C_{10}$, alpha-olefins. Such copolymers preferably have a degree of crystallinity of less than 25 wt. %, as determined by X-ray and differential scanning calorimetry, and a number average molecular weight (Mn) in the range of about 3,000 to about 250,000, preferably 5,000 to 150,000, as determined by gel permeation chromatography (GPC). Copolymers of ethylene and propylene are most preferred. Other alpha-olefins suitable in place of propylene to form the copolymer or to be used in combination with ethylene and propylene to form a terpolymer include 1-butene, 1-pentene, 1-hexene, 1-octene; also branched chain alpha-olefins, such as 5-methylpentene-1 and 6-methylheptene-1 and mixtures thereof.

Terpolymers of ethylene, said alpha-olefin and a non-conjugated diolefin or mixtures of such diolefins may also be used. The amount of the non-conjugated diolefin ranges from about 0.5 to 20 mole percent, preferably about 0.1 to about 7 mole percent, based on the total amount of ethylene and alpha-olefin present. Representative diolefins include cyclopentadiene, 2-methylene-5-norbornene, non-conjugated hexadiene, or any other alicyclic or aliphatic nonconjugated diolefin having from 6 to 15 carbon atoms per molecule, such as 2-methyl or ethyl norbornadiene, 2,4-dimethyl-2-octadiene, 3-(2-methyl-1-propene) cyclopentene, ethylidene norbornene, etc. These ethylene copolymers, this term including terpolymers, may be prepared using the well-known Ziegler-Natta catalyst compositions as described in U.K. Pat. No. 1,397,994. A suitable polymerization method is described, for example, at column 5, lines 24-46 of U.S. Pat. No. 6,107,257.

The Crossover Temperature

As noted above, the starting material copolymers that are reacted with the acylating agent, are copolymers containing a plurality of ethylene units and a plurality of one or more $C_3$-$C_{10}$ alpha-olefin units. These ethylene alpha-olefin copolymers can be any known in the art. However, we now discuss a particularly preferred type of ethylene alpha-olefin copolymer for use with the present invention.

One characteristic of the ethylene alpha-olefin copolymer that helps to define its behavior in low temperatures is its crossover temperature, or onset temperature. A copolymer may generally be viscoelastic; in other words, its mechanical properties are between that of a purely elastic solid and that of a purely viscous liquid. The viscoelastic behavior of the copolymer may be characterized as the combination of an elastic portion (referred to, alternatively, as an elastic modulus or a storage modulus), and a viscous portion (referred to, alternatively, as a viscous modulus or a loss modulus). The values of these moduli are used to characterize the viscoelastic properties of the copolymer at a certain temperature. A copolymer that has a relatively higher elastic portion and a relatively lower viscous portion will behave more similarly to a purely elastic solid, while a copolymer that has a relatively lower elastic portion and a relatively higher viscous portion will behave more similarly to a purely viscous liquid. Both the storage modulus and the loss modulus are each functions of temperature, although they may change at different rates as a function of temperature. In other words, the copolymer may exhibit more elasticity or more viscosity, depending on the temperature. The highest temperature at which a value of a storage modulus of the copolymer equals a value of a loss modulus being determined by oscillatory rheometry is referred to as the crossover temperature or the onset temperature.

Oscillatory rheology is one technique that may be used to determine values (generally expressed in units of pressure) for the loss and storage moduli. The basic principle of an oscillatory rheometer is to induce a sinusoidal shear deformation in the sample (e.g., a sample of copolymer) and measure the resultant stress response. In a typical experiment, the sample is placed between two plates. While the top plate remains stationary, a motor rotates or oscillates the bottom plate, thereby imposing a time dependent strain on the sample. Simultaneously, the time dependent stress is quantified by measuring the torque that the sample imposes on the top plate.

Measuring this time dependent stress response reveals characteristics about the behavior of the material. If the material is an ideal elastic solid, then the sample stress is proportional to the strain deformation, and the proportionality constant is the shear modulus of the material. The stress is always exactly in phase with the applied sinusoidal strain deformation. In contrast, if the material is a purely viscous fluid, the stress in the sample is proportional to the rate of strain deformation, where the proportionality constant is the viscosity of the fluid. The applied strain and the measured stress are out of phase.

Viscoelastic materials show a response that contains both in-phase and out-of-phase contributions. These contributions reveal the extents of solid-like and liquid-like behavior. A viscoelastic material will show a phase shift with respect to the applied strain deformation that lies between that of solids and liquids. These can be decoupled into an elastic component (the storage modulus) and a viscosity component (the loss modulus). The viscoelastic behavior of the system thus can be characterized by the storage modulus and the loss modulus, which respectively characterize the solid-like and fluid-like contributions to the measured stress response.

As mentioned, the values of the moduli are temperature dependent. At warmer temperatures, the value of the loss modulus for the copolymer is greater than the value of the storage modulus. However, as the temperature decreases, the copolymer may behave more like an elastic solid, and the degree of contribution from the storage modulus approaches that from the loss modulus. As the temperature lowers, eventually, at a certain temperature the storage modulus crosses the loss modulus of the pure copolymer, and becomes the predominant contributor to the viscoelastic behavior of the pure copolymer. As stated above, the temperature at which the storage modulus equals the loss modulus of the pure copolymer is referred to as the crossover temperature or the onset temperature. According to one or more embodiments, a lower crossover temperature of the copolymer correlates to better low temperature performance of oils into which the copolymer is incorporated.

Thus, according to one or more embodiments, the copolymer may have a crossover temperature, that is to say, a temperature at which the storage modulus of the copolymer is equal to the loss modulus of the copolymer, of −20° C. or lower, −25° C. or lower, −30° C. or lower, −35° C. or lower, or −40° C. or lower, or −50° C. or lower, −60° C. or lower, or −70° C. or lower; e.g., as determined by oscillatory rheometry. Other values are also possible. An advantageous crossover temperature for the copolymer may be achieved through controlling characteristics of the copolymer during its manufacture, as discussed herein. One such characteristic is an average ethylene-derived unit run length.

Average Run Length

According to one or more embodiments, the sequence of the ethylene-derived units and $C_3$-$C_{10}$ alpha-olefin derived units within the copolymer may be arranged in such a way as to provide good low temperature performance. The sequential arrangement of the different units may be characterized by an average ethylene-derived unit run length.

Methods for determining ethylene sequence values are known in the art and comprise established spectroscopic procedures using $^{13}C$ nuclear magnetic resonance methods as described, for example, in "Carbon-13 NMR in Polymer Science," *ACS Symposium Series* 103, American Chemical Society, Washington, D.C. 1978 at p. 97 and in "Polymer Sequence Determination Carbon-13 NMR Method," J. C. Randall, Academic Press, New York, N.Y. at p. 53.

In a copolymer molecule comprising a chain of first and second types of subunits (e.g., ethylene-derived and propylene-derived subunits), neither of the species will be distributed uniformly along the chain of the copolymer. Instead, a certain amount of random distribution of the different types of units will take place. For example, in a representative copolymer comprising four monomers of species A and four monomers of species B, the monomers may be distributed as follows A-A-B-A-B-B-B-A, or in any other manner. The average run length of a species is the average number of that species appearing sequentially, and may be determined for a copolymer, on the average, by dividing the total number of units of a species by the number of runs of that species. For example, in the above example, there are a total of four A units and three separate runs of A units. Therefore, the average run length of species A is 1.33. For species B, there is a total of four B units and two separate runs of B units. Therefore, the average run length of species B is 2.0. The average ethylene-derived unit run length $n_{c2}$ is defined as the total number of ethylene-derived units in the copolymer divided by a number of runs of one or more sequential ethylene-derived units in the copolymer, and the average ethylene-derived unit run length $n_{c2}$.

Where the arrangement of species A and B in a plurality of copolymer chains is purely random (i.e., each of A and B has a chance of appearing in a certain position proportional to the amount of that species, and regardless of whether the immediately preceding species is an A or a B unit), an expected average run length for species A can be statistically calculated as a function of the molar percentage of species A in the copolymer, as would be understood by a person of ordinary skill in the art. This value is referred to as the statistically-expected random average run-length.

According to one or more embodiments, the copolymer may be synthesized by a process through which the average run length of one of the copolymer species is less than the statistically-expected random average run length for the given molar percentage of that species, i.e., for a given position, there is a greater likelihood that a different species appears than the immediately preceding species (e.g., AB may be more favored than AA, statistically speaking). For example, taking ethylene and propylene as examples, one or more catalysts may be chosen such that during chain formation, a propylene unit is favored to bond to a preceding ethylene unit, while an ethylene unit is favored to bond to a preceding propylene unit, as discussed further below. As a result, the resulting average ethylene-derived unit run length is reduced and is less than statistically-expected random average unit length for the given molar percentage of ethylene. Where the average run length is less than what would be expected from random distribution, the copolymer is between statistical and alternating. Alternatively, where the average run length is greater than would be expected from random distribution the copolymer is between statistical and blocky.

According to one or more embodiments, an average run length for ethylene-derived units in the copolymer are, at least in part, a function of the percentage of ethylene units in the copolymer, and the chosen catalysts. For example, a higher percentage of ethylene units will naturally result in a higher average run length. The choice of catalyst affects the average run length, because the catalyst affects the relative rate of insertion of the different units.

Thus, using an ethylene-propylene copolymer as an illustrative example, during copolymer chain formation, the reaction rate at which an ethylene molecule bonds to a preceding ethylene unit at the end of the growing polymer chain is referred to as the ethylene-ethylene propagation reaction rate constant ("$k_{pEE}$"). The reaction rate at which a propylene (or other $C_3$-$C_{10}$ alpha-olefin comonomer) bonds to an ethylene unit at the end of the growing polymer chain is referred to as the ethylene-propylene propagation reaction rate constant ("$k_{pEP}$"). The reactivity ratio of ethylene ("$r_E$") refers to the ratio of the ethylene-ethylene propagation reaction rate constant to the ethylene-propylene propagation reaction rate constant, $k_{pEE}/k_{pEP}$.

Likewise, the reaction rate at which a propylene (or other $C_3$-$C_{10}$ alpha-olefin) molecule bonds to a propylene-derived unit at the end of the growing polymer chain is referred to as the propylene-propylene reaction rate constant ("$k_{pPP}$"). The reaction rate at which an ethylene molecule bonds to a propylene unit at the end of the growing polymer chain is referred to as the ethylene-propylene reaction rate constant ("$k_{pPE}$"). The reactivity ratio of propylene ("$r_P$") refers to the ratio of the propylene-propylene reaction rate constant to the propylene-ethylene reaction rate constant, $k_{pPP}/k_{pPE}$.

The lower each of the reactivity ratios ($r_E$ or $r_P$) are, the more likely it is that a different unit will follow the one preceding (e.g., ethylene follow propylene or vice versa) and the resulting polymer chain will have an alternating character, with a lower average ethylene-derived unit run length than would otherwise be expected from a purely random distribution of units. According to one or more embodiments, selection of an appropriate catalyst as discussed herein, as well as control of other process parameters, may reduce the reactivity ratios and therefore the average ethylene-derived unit run length, e.g., when copolymerized with propylene or other $C_3$-$C_{10}$ alpha olefins as discussed herein.

A lower average ethylene-derived unit run length may provide certain advantages. For example, it may result in a lower crossover temperature for the copolymer, thereby improving performance (e.g., cold-weather performance) of a lubricating oil comprising a viscosity index improver derived from the copolymer. In general, without wishing to be bound by any theory, it is believed that the shorter the average ethylene run length for a given ethylene content, the lower the crossover temperature of the copolymer, which ultimately results in a better low temperature performance for lubricating oils incorporating a viscosity index improver made from the copolymer. Known techniques may be used to determine the average run length of a species in a copolymer sample, for example NMR spectroscopy.

Figure 2:
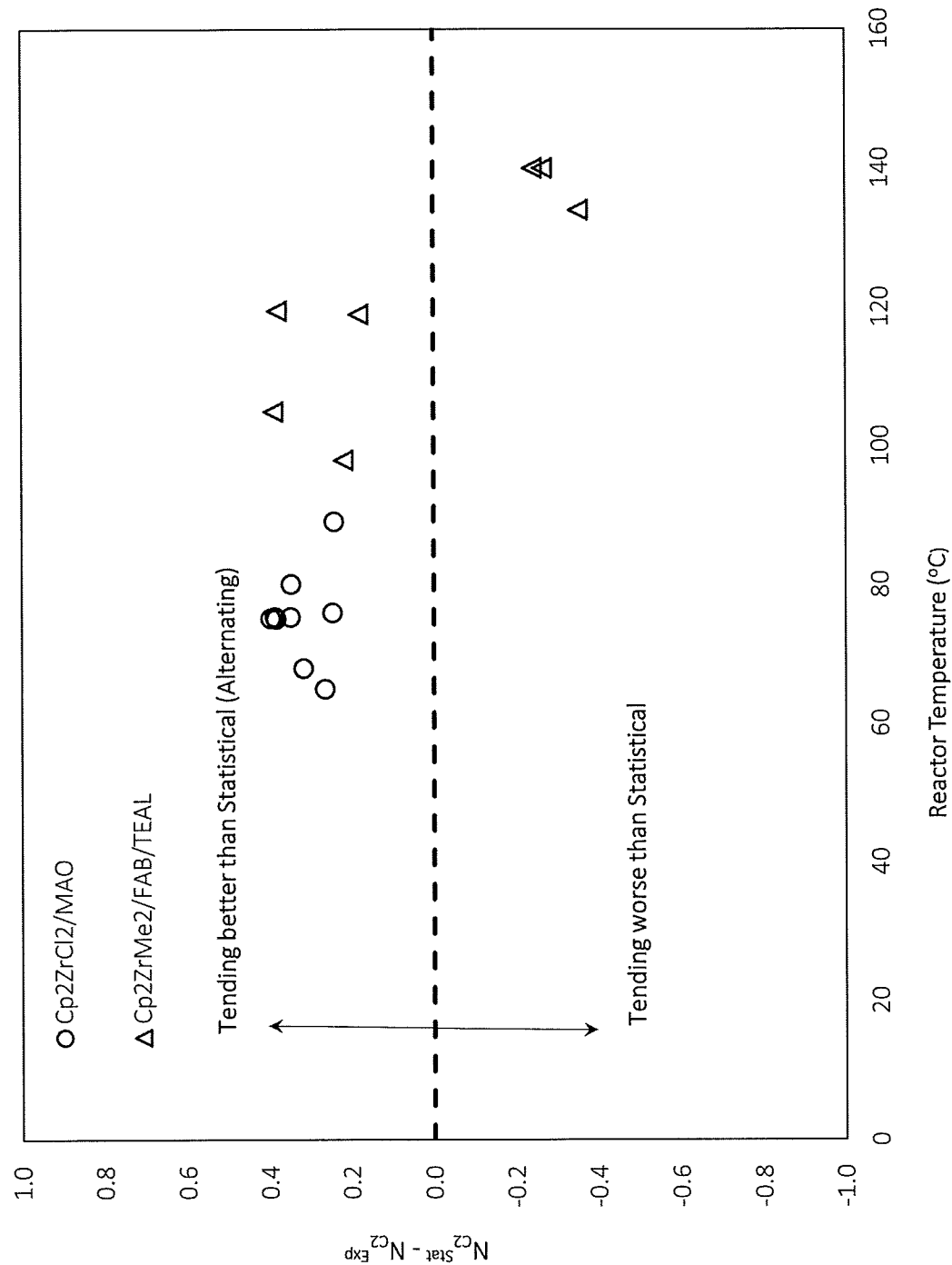
FIG. 2 is a graphical representation of the effect of reactor temperature on microstructure, according to one or more embodiments.

According to one or more embodiments, a copolymer comprising ethylene-derived units and $C_3$-$C_{10}$ alpha-olefin-derived units has an average ethylene-derived unit run length that is less than the statistically-expected random average ethylene-derived unit run-length for the given molar percentage of ethylene-derived units in the copolymer. For example, as shown in FIG. 2, use of a coordination polymerization catalyst comprising the coordinated metallocene $Cp_2ZrCl_2$, and methylaluminoxane as a co-catalyst, under certain reaction conditions, results in the production of a copolymer having an average ethylene-derived unit run length that is less than the statistically expected run length for a random distribution at a given percentage of ethylene units.

According to one or more embodiments, the copolymer may have an average ethylene run length that is less than 2.6, less than 2.5, less than 2.4, less than 2.3, less than 2.1, or less than 2.0. According to one or more embodiments, a copolymer comprising ethylene and a $C_3$-$C_{10}$ alpha-olefin species has an average ethylene-derived unit run length that is less than the statistically-expected random average ethylene-derived unit run-length for the given ethylene molar percentage in the copolymer.

Statistical and Alternating Microstructures

Copolymers of ethylene ($C_2$) and propylene ($C_3$) produced with perfectly alternating microstructures would not have a distribution of $C_2$ run lengths, as every ethylene sequence is exactly the same. The ethylene run length for a perfectly alternating microstructure is calculated from Equation (1).

$$n_{C2, Alternating} = \frac{x_{C2}}{(1 - x_{C2})} \quad (1)$$

However, copolymers that do not have a perfectly alternating microstructure would have a distribution of $C_2$ run lengths, and the prediction of a purely statistical microstructure represents the average $C_2$ run length (also referred to as, the "average ethylene run length") for the distribution of $C_2$ run lengths. The average $C_2$ run length for copolymers produced with a purely statistical microstructure can be calculated from Bernoullian statistics, as shown in Equation (2). The mole fraction of ethylene incorporated in the copolymer, $x_{c2}$, is used to calculate the fraction of EEE, EEP and PEP (there are also EPE, PPE and PPP triads) in a purely statistical copolymer through Equations (3)-(5).

$$n_{C2, Statistical} = \frac{(EEE + EEP + PEP)}{(PEP + 0.5EEP)} \quad (2)$$

$$EEE = (x_{C2})^3 \quad (3)$$

$$EEP = 2(x_{C2})^2 (1 - x_{C2}) \quad (4)$$

$$PEP = x_{C2}(1 - x_{C2})^2 \quad (5)$$

The experimental $C_2$ incorporation in mol % can be determined from $^1$H-NMR or $^{13}$C-NMR using standard techniques known to those of ordinary skill in the art. The experimental average $C_2$ run length can be determined from $^{13}$C-NMR using standard techniques. The comparison between the experimentally determined average $C_2$ run length and the calculations for the alternating and statistical results are shown in FIG. 1 at different ethylene incorporations. A comparison of the experimental results for average $C_2$ run length to the calculated statistical and alternating results yields an indication of whether the copolymers produced have microstructures worse or better than statistical. Without being bound by any theory, it is believed that microstructures that are worse than statistical have a broader distribution of $C_2$ run lengths about the average.

Increasing the ethylene content of the copolymer increases the plasticization efficiency, plasticization durability, and oxidative stability of the plasticizer but also decreases the amount of structure forming that may occur at lower temperatures. It is unexpected that the particular combination of properties and microstructure of the copolymer of the present invention provides adequate plasticization efficiency, plasticization durability, and oxidative stability while at the same time providing a good low temperature performance.

The results shown in FIG. 1 were produced with two different catalyst systems. The ethylene incorporation was controlled during the polymerization using standard techniques known in the art. The copolymerization using the $Cp_2ZrCl_2$/MAO catalyst system was carried out at a lower temperature and within a narrower temperature range than the copolymerization using the $Cp_2ZrMe_2$/FAB/TEAL catalyst system, shown in FIG. 2.

The copolymerization reaction can be controlled to provide the desired copolymers of the invention. Parameters such as the reaction temperature, pressure, mixing, reactor heat management, feed rates of one or more of the reactants, types, ratio, and concentration of catalyst and/or co-catalyst and/or scavenger as well as the phase of the feed components can be controlled to influence the structure of the copolymer obtained from the reaction. Thus, a combination of several different reaction conditions can be controlled to produce the desired copolymer.

For example, it is important to run the copolymerization reaction with appropriate heat management. Since the copolymerization reaction is exothermic, in order to maintain a desired set point temperature in the reactor heat must be removed. This can be accomplished by, for example, two different methods often practiced in combination. Heat can be removed by cooling the feed stream to the reactor to a temperature well below the reaction set point temperature (even sometimes cryogenically) and therefore allowing the feed stream to absorb some of the heat of reaction through a temperature rise. In addition, heat can be removed from the reactor by external cooling, such as a cooling coil and/or a cooling jacket. The lower the set point temperature in the reactor, the more demand there is for heat removal. The higher the reaction temperature, the less heat needs to be removed, or alternatively or in combination, the more concentrated the copolymer can be (higher productivity) and/or the shorter the residence time can be (smaller reactor). The results characterization the deviation of the average ethylene unit run length from a purely statistical microstructure are shown in FIG. 2 for both catalyst systems plotted versus the temperature of the reactor during the copolymerization.

As the reaction temperature was increased beyond 135° C., it appears that control of the microstructure may be lost and the copolymer typically becomes worse than statistical. As a result, the low temperature properties of the copolymer may be compromised. Without being bound by theory, the reduced control of the microstructure of copolymers produced at higher temperatures is believed to be due to a drop in the reaction kinetics of comonomer incorporation relative to ethylene incorporation. The more difficult it is for the comonomer to incorporate in the copolymer, the less regularly the comonomer breaks up the runs of ethylene units in the chain during copolymerization. Some strategies for improving the incorporation of comonomer at higher reaction temperatures include increasing the ratio of monomers of $C_3$-$C_{10}$ alpha-olefin/ethylene in the reactor, increasing the Al/Zr ratio in the catalyst or by making changes in the catalyst architecture.

Thus, in some embodiments of the invention, reaction temperatures of 60-135° C. are employed for the copolymerization reaction, or, more preferably, reaction temperatures of 62-130° C., or 65-125° C., or preferably 68-120° C. or 70-90° C., are employed for the copolymerization reaction.

Preferred Al/Zr ratio in the catalyst system may be less than 10,000:1, less than 1,000:1, less than 100:1, less than 10:1, less than 5:1, or less than 1:1. For boron-containing technology, a preferred Al/Zr ratio in the catalyst is less than 100:1, less than 50:1, less than 10:1, less than 5:1, less than 1:1, less than 0.1:1 and a preferred B/Zr ratio is less than 10:1, less than 5:1, less than 2:1, less than 1.5:1, less than 1.2:1, or less than 1:1.

Low temperature properties of the copolymer can be correlated to the microstructure of the copolymer. Low temperature performance of the pure copolymer is measured by Oscillatory Rheometry. The point at which storage modulus is equal to the loss modulus, namely, the crossover or onset temperature, is an indication of the temperature at which the copolymer will begin to exhibit unfavorable structure forming. The crossover temperature is the point at which the structure formed in the copolymer exceeds the liquid-like character of the copolymer. This temperature has been shown to be predictive for determining the impact of the copolymer structure on low temperature performance as a polyolefin plasticizer.

Figure 3:
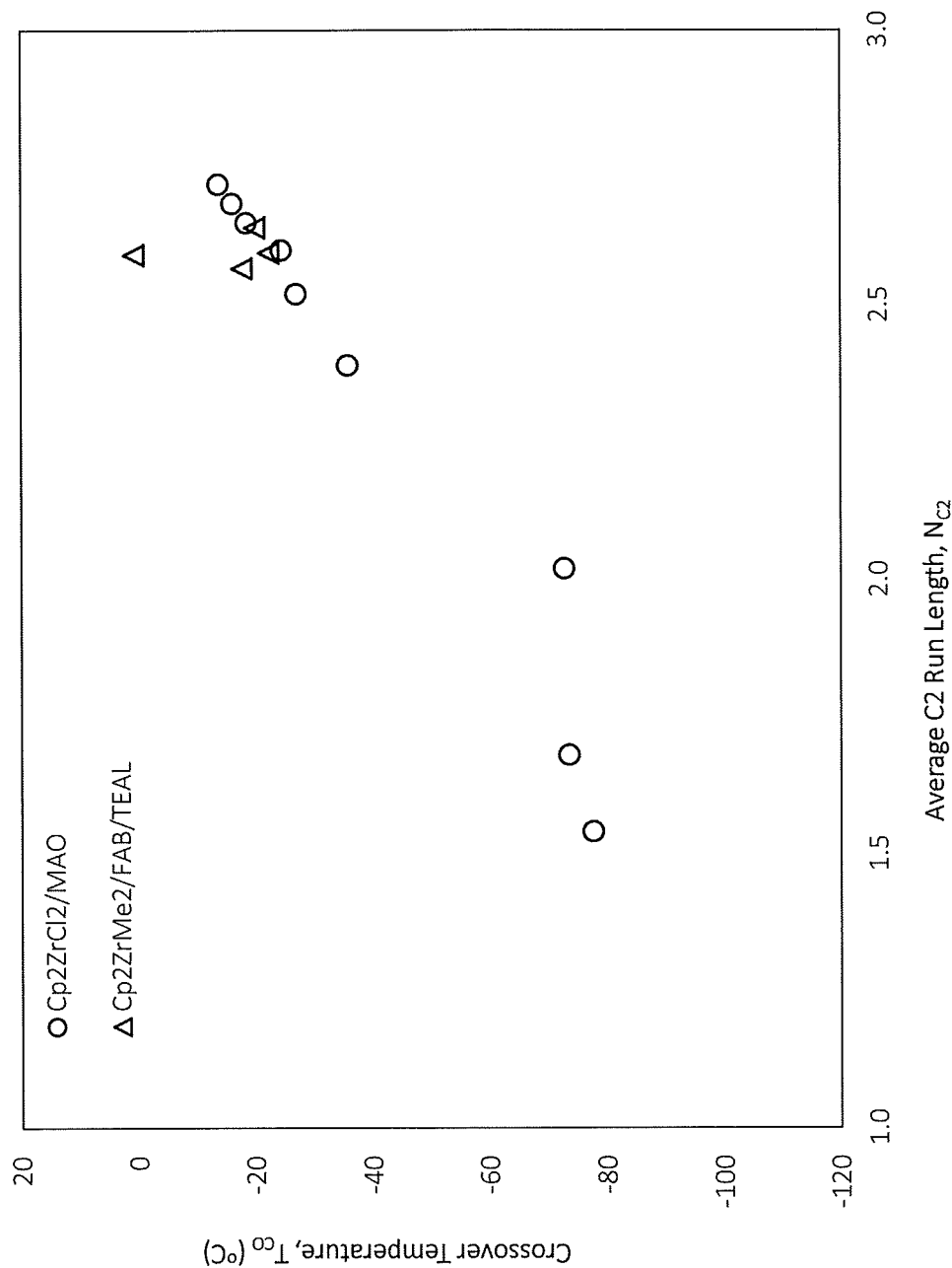
FIG. 3 is a graphical representation of the crossover temperature versus average ethylene run length for worse than statistical and better than statistical microstructures, according to one or more embodiments.
Figure 4:
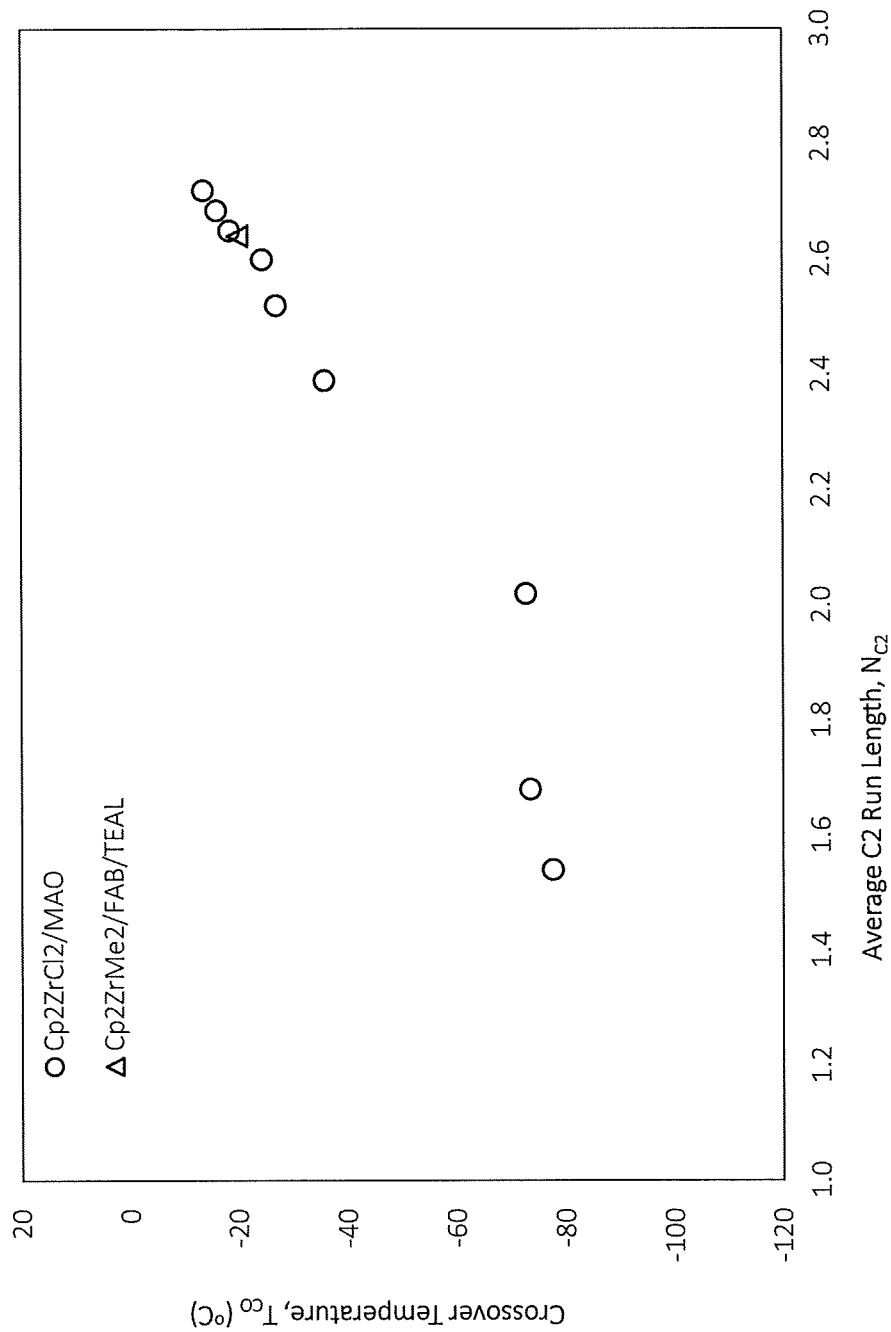
FIG. 4 is a graphical representation of the crossover temperature versus average ethylene run length for only copolymers better than statistical microstructures, according to one or more embodiments.

The impact of average ethylene unit run length on crossover temperature is shown in FIG. 3. The copolymers produced with the $Cp_2ZrCl_2$/MAO catalyst system are well-behaved and there is a strong correlation between crossover temperature and average ethylene unit run length. The copolymers produced with the $Cp_2ZrMe_2$/FAB/TEAL catalyst system can be controlled to provide the desired combination crossover temperature and average ethylene unit run length. A particularly wide range of crossover temperatures is observed for the copolymers produced using the $Cp_2ZrMe_2$/FAB/TEAL catalyst system is shown in FIG. 3. Specifically, at an approximate average $C_2$ unit run length of 2.6, the crossover temperature of these copolymers varies from almost −40° C. to about 5° C. This wide range in crossover temperature correlates with the wide variety of different microstructures that was also observed for these copolymers at the same average ethylene unit run length. In FIG. 4, only the data exhibiting better than statistical microstructures are included.

Triad Distribution

The sequential arrangement of units in the ethylene alpha-olefin copolymer may, alternatively, be described with reference to triad distribution. The triad distribution refers to the statistical distribution of the possible combinations of three subunits in a row in a copolymer chain. Taking as an example an ethylene-propylene copolymer, where "E" represents an ethylene-derived unit and "P" represents a propylene-derived unit, potential combinations for unit triads include: E-E-E, E-E-P, P-E-P, E-P-E, P-P-E, and P-P-P. According to one or more embodiments, the amount of E-E-E is less than 20%, less than 10%, or less than 5%, an indication of a relatively short average ethylene-derived unit run length.

The method used for calculating the triad distribution of ethylene-propylene copolymers is described in J. C. Randall JMS—Review Macromolecules Chem Physics C29, 201 (1989) and E. W. Hansen, K. Redford Polymer Vol. 37, No. 1, 19-24 (1996). After collecting $^{13}C(^1H)$ NMR data under quantitative conditions, eight regions (A-H), shown in Table 1 are integrated. The equations of Table 2 are applied and the values normalized. For the examples described herein, the D, E, and F regions were combined due to peak overlap is a normalization constant and T=total intensity.

TABLE 1

Integral Regions

| Region | Chemical Shift (ppm) |
| --- | --- |
| A | 43.5-48.0 |
| B | 36.5-39.5 |
| C | 32.5-33.5 |
| D | 29.2-31.2 |
| E | 28.5-29.3 |
| F | 26.5-27.8 |
| G | 23.5-25.5 |
| H | 19.5-22.5 |

TABLE 2

Equations $k(EEE) = 0.5(T_{DEF} + T_A + T_C + 3T_G - T_B - 2T_H)$
$K(PEE + EEP) = 0.5(T_H + 0.5T_B - T_A - 2T_G)$
$k(PEP) = T_G$
$k(EPE) = T_C$
$k(EPP + PPE) = 0.5(2T_H + T_B - 2T_A - 4T_C)$
$k(PPP) = 0.5(3T_A + 2T_C - 0.5T_B - T_H)$ Molecular Weight The number average molecular weight of the ethylene alpha-olefin copolymer can be determined by $^1$H-NMR or gel permeation chromatography (GPC), as described in U.S. Pat. No. 5,266,223. The GPC method additionally provides molecular weight distribution information; see W. W. Yau, J. J. Kirkland and D. D. Bly, "Modern Size Exclusion Liquid Chromatography", John Wiley and Sons, New York, 1979. According to some embodiments, the copolymer may have a number average molecular weight of 3,000 to 250,000 g/mol, or from 5,000 to 150,000 g/mol, as determined by GPC utilizing the polystyrene standard. According to some embodiments, the copolymer may have a number average molecular weight of greater than 3,000 g/mol, or of greater than 5,000 g/mol, as determined by GPC or the copolymer may have a number average molecular weight less than 250,000 g/mol or of less than 150,000 g/mol. Combinations of any of the above-referenced ranges are also possible (e.g., 3,000-150,000 g/mol, greater than g/mol and less than g/mol or greater than g/mol and less than g/mol). Other values are also possible. In addition, in some cases, NMR may be used in addition and/or instead of GPC, e.g., for determining the values described above.

The polydispersity index (PDI) of the copolymer is a measure of the variation in size of the individual chains of the copolymer. The polydispersity index is determined by dividing the weight average molecular weight of the copolymer by the number average molecular weight of the copolymer. The term number average molecular weight (determined by, e.g., $^1$H-NMR or GPC) is given its ordinary meaning in the art and is defined as the sum of the products of the weight of each polymer chain and the number of polymer chains having that weight, divided by the total number of polymer chains. The weight average molecular weight of the copolymer is given its ordinary meaning in the art and is defined as the sum of the products of the weight squared of each polymer chain and the total number of polymer chains having that weight, divided by the sum of the products of the weight of each polymer chain and the number of polymer chains having that weight. According to one or more embodiments, the PDI of the copolymer may be less than or equal to 4, less than or equal to 3, less than or equal to 2, or less than or equal to 1.

Ethylene Content

The ethylene alpha-olefin copolymer may comprise a certain mole percentage (mol %) of ethylene derived units in some embodiments. According to some embodiments, the ethylene content of the copolymer, relative to the total amount of the units within the copolymer, is at least 10 mol %, at least 20 mol %, at least 30 mol %, at least 40 mol %, at least 45 mol %, at least 50 mol %, at least 55 mol %, at least 60 mol %, at least 65 mol %, at least 70 mol %, or at least 75 mol %. According to some embodiments, the ethylene content of the copolymer is less than 80 mol %, less than 75 mol %, less than 70 mol %, less than 65 mol %, less than 60 mol %, less than 55 mol %, less than 50 mol %, less than 45 mol %, less than 40 mol %, less than 30 mol %, or less than 20 mol %, Combinations of the above referenced ranges are also possible (e.g., at least 10 mol % and less than 80 mol %, at least 20 mol % and less than 70 mol %, at least 30 mol % and less than 65 mol %, at least 40 mol % and less than 60 mol %). Other ranges are also possible, e.g., determined by $^1$H-NMR or $^{13}$C-NMR.

Comonomer Content

The ethylene alpha-olefin copolymer may comprise a certain mole percentage of comonomer units, where the comonomer is selected from a group consisting of $C_3$-$C_{10}$ alpha-olefins having a carbon number at or between 3 and 10, e.g., propylene. According to some embodiments, the comonomer content of the copolymer, relative to the total amount of the monomers within the copolymer, is at least 20 mol %, at least 25 mol %, at least 30 mol %, at least 35 mol %, at least 40 mol %, at least 45 mol %, at least 50 mol %, at least 55 mol %, at least 60 mol %, at least 65 mol %, at least 70 mol %, or at least 80 mol %. According to some embodiments, the comonomer content of the copolymer is less than 90 mol %, less than 80 mol %, less than 70 mol %, less than 65 mol %, less than 60 mol %, less than 55 mol %, less than 50 mol %, less than 45 mol %, less than 40 mol %, less than 35 mol %, less than 30 mol %, less than 25 mol %, or less than 20 mol %, less than 90 mol %. Combinations of the above reference ranges are possible (e.g., at least 40 mol %, and less than 60 mol %). Other ranges are also possible.

Unsaturation

The ethylene alpha-olefin copolymer may comprise polymeric chains. In some cases, at least 70% of these chains may each possess a terminal unsaturation, i.e., a carbon-carbon double bond in the terminal monomer unit of the copolymer. According to some embodiments, less than 50%, less than 45%, less than 40%, less than 35%, less than 30%, less than 25%, less than 20%, less than 15%, less than 10%, less than 5%, or less than 3%, of the copolymer molecules each possess a carbon-carbon double bond. Preferably, the copolymer molecules do not possess any terminal unsaturation. The percentage of polymeric chains exhibiting terminal unsaturation may be determined by, e.g., FTIR spectroscopic analysis, titration, or $^{13}$C NMR. See, e.g., U.S. Pat. No. 5,128,056.

Copolymerization

According to one or more embodiments, various methods are provided for synthesizing the ethylene alpha-olefin copolymers described here. One method is polymerizing ethylene and a $C_3$-$C_{10}$ alpha-olefin in the presence of a single-site coordination polymerization catalyst to produce a copolymer comprising ethylene-derived units and $C_3$-$C_{10}$ alpha-olefin-derived units.

According to one or more embodiments, the coordination polymerization catalyst may comprise a coordinated metallocene. A metallocene comprises cyclopentadienyl anions ("Cp") bound to a metal center. The coordinated metallocene may comprise a zirconium. For example, the coordinated metallocene may comprise $Cp_2ZrCl_2$. The coordination polymerization catalyst may further comprises a co-catalyst. The co-catalyst may comprise, for example, methylaluminoxane.

The copolymer may be produced in a reactor. Parameters that may be controlled during the process include pressure and temperature. The reaction may be operated continuously, semi-continuously, or batchwise. The ethylene may be delivered to a reactor through a metered feed of ethylene gas. The additional $C_3$-$C_{10}$ alpha-olefin component (e.g., propylene) of the copolymer may be delivered through a separate metered feed. The catalyst and co-catalyst may be delivered to the reactor in solution. The weight percent of either the catalyst or co-catalyst in the solution may be less than 20 wt. %, less than 15 wt. %, less than 10 wt. %, less than 8 wt. %, less than 6 wt. %, less than 5 wt. %, less than 4 wt. %, less than 3 wt. %, less than 2 wt. %, or less than 1 wt. %, according to different embodiments. The components may then be mixed in the reactor. Examples of different processes for forming the copolymer are described in the examples below.

In some embodiments, the microstructures are obtained by uniformly spatially distributing the composition within a reactor. Methods of ensuring composition uniformity include, but are not limited to, agitation, feed locations of monomers, solvent and catalyst components and methods for introducing. Additional factors that may impact compositional uniformity in some cases include ensuring operating at optimal temperature and pressure space that provides a single fluid phase with the reactor based on the reactor composition and quite possibly ensuring the reactor temperature and pressure conditions are above the entire vapor-liquid phase behavior envelope of the feed composition. It is also envisioned that premixing of two or more of the feed components may be important and the premixing time and mixing intensity of the feed components is important for control of uniformity within the reactor, at least in some cases. Another subtle, but important feature of certain embodiments is to ensure no pockets of vapor exist within the reactor that would create a composition gradient either at a vapor-liquid interface or within the liquid. Lower temperatures are also believed to be important for controlling the reactivity ratios in a manner that leads to microstructures with better than statistical microstructures and tending toward alternating microstructures. Some or all of the above may be important for controlling the microstructure within a polymer chain and also the comonomer composition variation from chain to chain, in various embodiments.

Low Metal and/or Fluorine Content

Low metal content ethylene alpha-olefin copolymers are desirable for many uses due to the harmful effects of metals in various environments. For example, metals or ash can have an adverse impact on after-treatment devices employed in various types of engines. It is also desirable to ensure that the copolymers have a low fluorine content since fluorine is ecologically undesirable in many environments.

There are several methods to achieve a low metal content in the copolymer as described herein. The present invention incorporates methods known by those skilled in the art to purify and remove impurities. For example, in Giuseppe Forte and Sara Ronca, "Synthesis of Disentangled Ultra-High Molecular Weight Polyethylene: Influence of Reaction Medium on Material Properties," International Journal of Polymer Science, vol. 2017, Article ID 7431419, 8 pages, 2017. doi:10.1155/2017/7431419, methods for purifying a polyethylene compound are disclosed. The method of purifying the copolymer comprises dissolving the copolymer in acidified methanol ($CH_3OH$/HCl) to a DCM (dichloromethane) solution of the polymer/catalyst mixture. This results in precipitation of the "purified" polymer, while the catalyst and other byproducts remain in solution. The copolymer may then be filtered and washed out with additional methanol, and oven dried under vacuum at 40° C.

According to one or more embodiments, the ethylene alpha-olefin copolymer may be purified to achieve a low metal content by passing the polymer/catalyst mixture through an adsorption column. The adsorption column contains an adsorber, preferably, activated alumina.

In a more preferred embodiment, the copolymer may be purified to achieve a low metal content by stripping the polymer compositions using toluene and a rotavap with a temperature-controlled oil bath.

In an alternative embodiment, the ethylene alpha-olefin copolymer does not require a purification step. In this embodiment, the copolymer of the present invention is preferably copolymerized using a catalyst having a catalyst productivity of from 200-1500 kg copolymer/gram of single-site catalyst, or from 350-1500 kg copolymer/gram of single-site catalyst, or from 500-1200 kg copolymer/gram of single-site catalyst, or from 500-800 kg copolymer/gram of single-site catalyst. Suitable single-site catalyst systems having these productivities may be selected from those known in the art. The catalysts may be selected for the production of copolymers having Mn's in the range of 700-1400 g/mol. or from 550-650 g/mol. Selection of a suitable single-site catalyst may eliminates the need for a wash step to achieve the low metal content of the copolymer.

Catalyst productivity, expressed as the kg polymer produced per gram of catalyst, may be improved by efficient catalyst systems. The present invention incorporates the use of catalyst systems known by those skilled in the art which are capable of achieving high catalyst productivities. For example, U.S. Pat. No. 9,441,063 relates to catalyst compositions containing activator-supports and half-metallocene titanium phosphinimide complexes or half-metallocene titanium iminoimidazolidides capable of producing polyolefins with high catalyst productivities of at least up to 202 kg polymer/g catalyst (551 kg polymer/g cat/hr with a 22 min residence time, See Example 5 and Table 1, Columns 47 and 48.) Also, U.S. Pat. No. 8,614,277 relates to methods for preparing isotactic polypropylene and ethylene-propylene copolymers. U.S. Pat. No. 8,614,277 provides catalyst systems suitable for preparing copolymers at catalyst productivity levels greater than 200 kg polymer/g catalyst. The catalysts provided therein are metallocenes comprising zirconium as their central atom. (See the examples in Tables 1a-1c).

The copolymer may comprise a metal or ash content of 25 ppmw or less, based on the total weight of the copolymer. Preferably, the metal or ash content of the copolymer is 10 ppmw or less, or more preferably 5 ppmw or less, or even more preferably 1 ppmw or less, based on the total weight of the copolymer. Typically, the metal or ash content of the copolymer is derived from the single-site catalyst and optional co-catalyst(s) employed in the copolymerization reactor.

These single-site catalysts may include metallocene catalysts. Zr and Ti metals are typically derived from such metallocene catalysts. Various co-catalysts may be employed in combination with the single-site catalyst. Such co-catalysts may include boron and aluminum metals, as well as ecologically undesirable fluorine atoms or compounds. Thus, the metal or ash content of the copolymers of the present invention is the total metal or ash including Zr. Ti, Al and/or B. Various suitable catalyst systems are described elsewhere herein.

The copolymers may have a fluorine content of less than 10 ppmw, or less than 8 ppmw, or less than 5 ppmw, based on the total weight of the copolymer. Typically, the fluorine will come from co-catalyst systems based on boron compounds such as perfluoroaryl boranes.

Grafting of the Copolymer

The free-radical induced grafting of ethylenically unsaturated carboxylic acid materials in solvents, such as hexane or benzene is known in the art. A suitable grafting process is described, for example, in U.S. Pat. No. 6,107,257 at col. 5, line 47 to col. 6, line 63. The grafting according to the process of this invention is carried out at an elevated temperature in the range of about 100° C. to 250° C., preferably 120° C. to 190° C., and more preferably 150° C. to 180° C., e.g. above 160° C., in a solvent, preferably a mineral lubricating oil solution containing, e.g. 1 to 50, preferably 5 to 30 wt. %, based on the initial total oil solution, of the ethylene polymer and preferably under an inert environment. The grafting is carried out in the presence of a high-temperature decomposable compound capable of supplying free radicals at said elevated temperature.

The free-radical initiators which may be used are peroxides, hydroperoxides, and azo compounds which have a boiling point greater than about 100.degree. C. and decompose thermally within the grafting temperature range to provide said free radicals. Representative of these free-radical initiators are azobutyronitrile and 2,5-dimethyl-hex-3-yne-2,5-bis-tertiary-butyl peroxide or its hexene analogue. The initiator is used at a level of between about 0.005 wt. % and about 1 wt. %, based on the total weight of the polymer solution.

The ethylenically unsaturated dicarboxylic acid material, e.g. maleic anhydride, is used in an amount ranging from about 0.01 wt. % to about 10 wt. %, preferably 0.1 wt. % to 2.0 wt. %, based on the weight of the initial total oil solution.

The grafting is preferably carried out in an inert atmosphere, such as by nitrogen blanketing. While the grafting can be carried out in the presence of air, the yield of the desired graft polymer is decreased as compared to grafting under an inert atmosphere. The grafting time ranges from about 0.1 to 12 hours, preferably from about 0.5 to 6 hours, more preferably 0.5 to 3 hours. The graft reaction is carried out to at least approximately 4 times, preferably at least about 6 times the half-life of the free-radical initiator at the reaction temperature employed. The time and temperature combination should be such that substantially all the peroxide (i.e. above 90 mol %) is decomposed.

In the grafting process, the copolymer solution is first heated to grafting temperature and thereafter said dicarboxylic acid material and initiator are added with agitation although they could have been added prior to heating. When the reaction is complete, the excess maleic anhydride is eliminated by an inert gas purge, e.g. nitrogen sparging.

The grafting is preferably carried out in a mineral lubricating oil which need not be removed after the grafting step but can be used as the solvent in the subsequent reaction of the graft polymer with the polyfunctional material and as a solvent for the end product to form the concentrate.

Lubricating Oil

According to one or more embodiments, the viscosity index improvers described herein may be introduced to a major amount of a base oil to produce a lubricating oil. Preferred lubricating oils may also contain at least a dispersant and/or a pour point depressant. The lubricating oils may contain common additives used in lubricants or engine oils, including, but not limited to one or more of dispersants, detergents, friction modifiers, anti-wear agents, defoamers, antioxidants and pour point depressants. In some embodiments, the lubricating composition is an engine oil composition or a crankcase oil composition.

According to some embodiments, the lubricating oil comprises a certain weight percentage of the viscosity index improver. In one or more embodiments, the lubricating composition comprises about 0.001 wt. % to about 20 wt. % for a finished product (e.g., a fully formulated engine oil composition), with alternative lower limits of 0.01 wt. %, 0.05 wt. %, 0.1 wt. %, 0.25 wt. %, 1 wt. % or 2 wt. %, and alternative upper limits of 15 wt. % or 10 wt. % or 8 wt. % or 6 wt. % or 5 wt. % or 4 wt. % or 3 wt. %. Ranges for the concentration of the viscosity index improver in the engine oil composition may be made by combining any of the lower limits with any of the foregoing upper limits.

Lubricants, combinations of components, or individual components of the present description may be suitable for use in various types of internal combustion engines. Suitable engine types may include, but are not limited to heavy duty diesel, passenger car, light duty diesel, medium speed diesel, or marine engines. An internal combustion engine may be a diesel fueled engine, a gasoline fueled engine, a natural gas fueled engine, a bio-fueled engine, a mixed diesel/biofuel fueled engine, a mixed gasoline/biofuel fueled engine, an alcohol fueled engine, a mixed gasoline/alcohol fueled engine, a compressed natural gas (CNG) fueled engine, or mixtures thereof. A diesel engine may be a compression ignited engine. A gasoline engine may be a spark-ignited engine. An internal combustion engine may also be used in combination with an electrical or battery source of power. An engine so configured is commonly known as a hybrid engine. The internal combustion engine may be a 2-stroke, 4-stroke, or rotary engine. Suitable internal combustion engines include marine diesel engines (such as inland marine), aviation piston engines, low-load diesel engines, and motorcycle, automobile, locomotive, and truck engines.

The internal combustion engine may contain components of one or more of an aluminum-alloy, lead, tin, copper, cast iron, magnesium, ceramics, stainless steel, composites, and/or mixtures thereof. The components may be coated, for example, with a diamond-like carbon coating, a lubrited coating, a phosphorus-containing coating, molybdenum-containing coating, a graphite coating, a nano-particle-containing coating, and/or mixtures thereof. The aluminum-alloy may include aluminum silicates, aluminum oxides, or other ceramic materials. In one embodiment the aluminum-alloy is an aluminum-silicate surface. As used herein, the term "aluminum alloy" is intended to be synonymous with "aluminum composite" and to describe a component or surface comprising aluminum and another component intermixed or reacted on a microscopic or nearly microscopic level, regardless of the detailed structure thereof. This would include any conventional alloys with metals other than aluminum as well as composite or alloy-like structures with non-metallic elements or compounds such with ceramic-like materials.

The lubricating oil composition for an internal combustion engine may be suitable for any engine lubricant irrespective of the sulfur, phosphorus, or sulfated ash (ASTM D-874) content. The sulfur content of the engine oil lubricant may be about 1 wt. % or less, or about 0.8 wt. % or less, or about 0.5 wt. % or less, or about 0.3 wt. % or less, or about 0.2 wt. % or less. In one embodiment the sulfur content may be in the range of about 0.001 wt. % to about 0.5 wt. %, or about 0.01 wt. % to about 0.3 wt. %. The phosphorus content may be about 0.2 wt. % or less, or about 0.1 wt. % or less, or about 0.085 wt. % or less, or about 0.08 wt. % or less, or even about 0.06 wt. % or less, about 0.055 wt. % or less, or about 0.05 wt. % or less. In one embodiment the phosphorus content may be about 50 ppm to about 1000 ppm, or about 325 ppm to about 850 ppm. The total sulfated ash content may be about 2 wt. % or less, or about 1.5 wt. % or less, or about 1.1 wt. % or less, or about 1 wt. % or less, or about 0.8 wt. % or less, or about 0.5 wt. % or less. In one embodiment the sulfated ash content may be about 0.05 wt. % to about 0.9 wt. %, or about 0.1 wt. % or about 0.2 wt. % to about 0.45 wt. %. In another embodiment, the sulfur content may be about 0.4 wt. % or less, the phosphorus content may be about 0.08 wt. % or less, and the sulfated ash is about 1 wt. % or less. In yet another embodiment the sulfur content may be about 0.3 wt. % or less, the phosphorus content is about 0.05 wt. % or less, and the sulfated ash may be about 0.8 wt. % or less.

In one embodiment the lubricating oil composition is an engine oil, wherein the lubricating oil composition may have (i) a sulfur content of about 0.5 wt. % or less, (ii) a phosphorus content of about 0.1 wt. % or less, and (iii) a sulfated ash content of about 1.5 wt. % or less.

In one embodiment the lubricating oil composition is suitable for a 2-stroke or a 4-stroke marine diesel internal combustion engine. In one embodiment the marine diesel combustion engine is a 2-stroke engine. In some embodiments, the lubricating oil composition is not suitable for a 2-stroke or a 4-stroke marine diesel internal combustion engine for one or more reasons, including but not limited to, the high sulfur content of fuel used in powering a marine engine and the high TBN required for a marine-suitable engine oil (e.g., above about 40 TBN in a marine-suitable engine oil).

In some embodiments, the lubricating oil composition is suitable for use with engines powered by low sulfur fuels, such as fuels containing about 1 wt. % to about 5 wt. % sulfur. Highway vehicle fuels contain about 15 ppm sulfur (or about 0.0015 wt. % sulfur).

Low speed diesel typically refers to marine engines, medium speed diesel typically refers to locomotives, and high speed diesel typically refers to highway vehicles. The lubricating oil composition may be suitable for only one or all of these types of vehicles.

Further, lubricants of the present description may be suitable to meet one or more industry specification requirements such as ILSAC GF-3, GF-4, GF-5, GF-5+, GF-6, PC-11, CF, CF-4, CH-4, CI-4, CJ-4, API SG, SJ, SL, SM, SN, SN+, ACEA A1/B1, A2/B2, A3/B3, A3/B4, A5/B5, C1, C2, C3, C4, C5, E4/E6/E7/E9, Euro 5/6, Jaso DL-1, Low SAPS, Mid SAPS, or original equipment manufacturer specifications such as Dexos™ 1, Dexos™ 2, MB-Approval 229.1, 229.3, 229.5, 229.31, 229.51, 229.52, 229.6, 229.71, 226.5, 226.51, 228.0/.1, 228.2/.3, 228.31, 228.5, 228.51, 228.61, VW 501.01, 502.00, 503.00/503.01, 504.00, 505.00, 505.01, 506.00/506.01, 507.00, 508.00, 509.00, 508.88, 509.99, BMW Longlife-01, Longlife-01 FE, Longlife-04, Longlife-12 FE, Longlife-14 FE+, Porsche A40, C30, Peugeot Citroën Automobiles B71 2290, B71 2294, B71 2295, B71 2296, B71 2297, B71 2300, B71 2302, B71 2312, B71 2007, B71 2008, Renault RN0700, RN0710, RN0720, Ford WSS-M2C153-H, WSS-M2C930-A, WSS-M2C945-A, WSS-M2C913A, WSS-M2C913-B, WSS-M2C913-C, WSS-M2C913-D, WSS-M2C948-B, WSS-M2C948-A, GM 6094-M, Chrysler MS-6395, Fiat 9.55535 G1, G2, M2, N1, N2, Z2, S1, S2, S3, S4, T2, DS1, DSX, GH2, GS1, GSX, CR1, Jaguar Land Rover STJLR.03.5003, STJLR.03.5004, STJLR.03.5005, STJLR.03.5006, STJLR.03.5007, STJLR.51.5122, or any past or future PCMO or HDD specifications not mentioned herein. In some embodiments for passenger car motor oil (PCMO) applications, the amount of phosphorus in the finished fluid is 1000 ppm or less or 900 ppm or less or 800 ppm or less.

The present disclosure provides novel lubricating oil blends formulated for use as automotive crankcase lubricants. The present disclosure provides novel lubricating oil blends formulated for use as 2 T and/or 4 T motorcycle crankcase lubricants. Embodiments of the present disclosure may provide lubricating oils suitable for crankcase applications and having improvements in the following characteristics: air entrainment, alcohol fuel compatibility, antioxidancy, antiwear performance, biofuel compatibility, foam reducing properties, friction reduction, fuel economy, pre-ignition prevention, rust inhibition, sludge and/or soot dispersability, piston cleanliness, deposit formation, and water tolerance.

Engine oils of the present disclosure may be formulated by the addition of one or more additives, as described in detail below, to an appropriate base oil formulation. The additives may be combined with a base oil in the form of an additive package (or concentrate) or, alternatively, may be combined individually with a base oil (or a mixture of both). The fully formulated engine oil may exhibit improved performance properties, based on the additives added and their respective proportions.

Base Oil

The base oil used in the lubricating oil compositions herein may be selected from any of the base oils in Groups I-V as specified in the American Petroleum Institute (API) Base Oil Interchangeability Guidelines. The five base oil groups are as follows:

TABLE 3

| Base oil Category | Sulfur (wt. %) | | Saturates (wt. %) | Viscosity Index |
|---|---|---|---|---|
| Group I | >0.03 | and/or | <90 | 80 to 120 |
| Group II | ≤0.03 | and | ≥90 | 80 to 120 |
| Group III | ≤0.03 | and | ≥90 | ≥120 |
| Group IV | All polyalphaolefins (PAOs) | | | |
| Group V | All others not included in Groups I, II, III, or IV | | | |

Groups I, II, and III are mineral oil process stocks. Group IV base oils contain true synthetic molecular species, which are produced by polymerization of olefinically unsaturated hydrocarbons. Many Group V base oils are also true synthetic products and may include diesters, polyol esters, polyalkylene glycols, alkylated aromatics, polyphosphate esters, polyvinyl ethers, and/or polyphenyl ethers, and the like, but may also be naturally occurring oils, such as vegetable oils. It should be noted that although Group III base oils are derived from mineral oil, the rigorous processing that these fluids undergo causes their physical properties to be very similar to some true synthetics, such as PAOs. Therefore, oils derived from Group III base oils may be referred to as synthetic fluids in the industry. Group II+ may comprise high viscosity index Group II. In one embodiment, the base oil is selected from a Group II base oil having at least 90 wt. % saturates, a Group III base oil having a least 90 wt. % saturates, a Group IV base oil, a Group V base oil and mixtures thereof.

The base oil used in the disclosed lubricating oil composition may be a mineral oil, animal oil, vegetable oil, synthetic oil, synthetic oil blends, or mixtures thereof. Suitable oils may be derived from hydrocracking, hydrogenation, hydrofinishing, unrefined, refined, and re-refined oils, and mixtures thereof.

Unrefined oils are those derived from a natural, mineral, or synthetic source without or with little further purification treatment. Refined oils are similar to the unrefined oils except that they have been treated in one or more purification steps, which may result in the improvement of one or more properties. Examples of suitable purification techniques are solvent extraction, secondary distillation, acid or base extraction, filtration, percolation, and the like. Oils refined to the quality of an edible may or may not be useful. Edible oils may also be called white oils. In some embodiments, lubricating oil compositions are free of edible or white oils.

Re-refined oils are also known as reclaimed or reprocessed oils. These oils are obtained similarly to refined oils using the same or similar processes. Often these oils are additionally processed by techniques directed to removal of spent additives and oil breakdown products.

Mineral oils may include oils obtained by drilling or from plants and animals or any mixtures thereof. For example such oils may include, but are not limited to, castor oil, lard oil, olive oil, peanut oil, corn oil, soybean oil, and linseed oil, as well as mineral lubricating oils, such as liquid petroleum oils and solvent-treated or acid-treated mineral lubricating oils of the paraffinic, naphthenic or mixed paraffinic-naphthenic types. Such oils may be partially or fully hydrogenated, if desired. Oils derived from coal or shale may also be useful.

Useful synthetic lubricating oils may include hydrocarbon oils such as polymerized, oligomerized, or interpolymerized olefins (e.g., polybutylenes, polypropylenes, propyleneisobutylene copolymers); poly(1-hexenes), poly(1-octenes), trimers or oligomers of 1-decene, e.g., poly(1-decenes), such materials being often referred to as α-olefins, and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulfides and the derivatives, analogs and homologs thereof or mixtures thereof. Polyalphaolefins are typically hydrogenated materials.

Other synthetic lubricating oils include polyol esters, diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerized Fischer-Tropsch hydrocarbons or waxes. In one embodiment oils may be prepared by a Fischer-Tropsch gas-to-liquid synthetic procedure as well as other gas-to-liquid oils.

The major amount of base oil included in a lubricating composition may be selected from the group consisting of Group I, Group II, a Group III, a Group IV, a Group V, and a combination of two or more of the foregoing, and wherein the major amount of base oil is other than base oils that arise from provision of additive components or viscosity index improvers in the composition. In another embodiment, the major amount of base oil included in a lubricating composition may be selected from the group consisting of Group II, a Group III, a Group IV, a Group V, and a combination of two or more of the foregoing, and wherein the major amount of base oil is other than base oils that arise from provision of additive components or viscosity index improvers in the composition.

The amount of the oil of lubricating viscosity present may be the balance remaining after subtracting from 100 wt. % the sum of the amount of the performance additives inclusive of viscosity index improver(s) and/or pour point depressant(s) and/or other top treat additives. For example, the oil of lubricating viscosity that may be present in a finished fluid may be a major amount, such as greater than about 50 wt. %, greater than about 60 wt. %, greater than about 70 wt. %, greater than about 80 wt. %, greater than about 85 wt. %, or greater than about 90 wt. %.

Antioxidants

The lubricating oil compositions herein also may optionally contain one or more antioxidants. Antioxidant compounds are known and include for example, phenates, phenate sulfides, sulfurized olefins, phosphosulfurized terpenes, sulfurized esters, aromatic amines, alkylated diphenylamines (e.g., nonyl diphenylamine, di-nonyl diphenylamine, octyl diphenylamine, di-octyl diphenylamine), phenyl-alpha-naphthylamines, alkylated phenyl-alpha-naphthylamines, hindered non-aromatic amines, phenols, hindered phenols, oil-soluble molybdenum compounds, macromolecular antioxidants, or mixtures thereof. Antioxidant compounds may be used alone or in combination.

The hindered phenol antioxidant may contain a secondary butyl and/or a tertiary butyl group as a sterically hindering group. The phenol group may be further substituted with a hydrocarbyl group and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, or 4-dodecyl-2,6-di-tert-butylphenol. In one embodiment the hindered phenol antioxidant may be an ester and may include, e.g., Irganox™ L-135 available from BASF or an addition product derived from 2,6-di-tert-butylphenol and an alkyl acrylate, wherein the alkyl group may contain about 1 to about 18, or about 2 to about 12, or about 2 to about 8, or about 2 to about 6, or about 4 carbon atoms. Another commercially available hindered phenol antioxidant may be an ester and may include Ethanox™ 4716 available from Albemarle Corporation.

Useful antioxidants may include diarylamines and high molecular weight phenols. In an embodiment, the lubricating oil composition may contain a mixture of a diarylamine and a high molecular weight phenol, such that each antioxidant may be present in an amount sufficient to provide up to about 5 wt. %, based upon the final weight of the lubricating oil composition. In an embodiment, the antioxidant may be a mixture of about 0.3 wt. % to about 1.5 wt. % diarylamine and about 0.4 wt. % to about 2.5 wt. % high molecular weight phenol, by weight, based upon the final weight of the lubricating oil composition.

Examples of suitable olefins that may be sulfurized to form a sulfurized olefin include propylene, butylene, isobutylene, polyisobutylene, pentene, hexene, heptene, octene, nonene, decene, undecene, dodecene, tridecene, tetradecene, pentadecene, hexadecene, heptadecene, octadecene, nonadecene, eicosene or mixtures thereof. In one embodiment, hexadecene, heptadecene, octadecene, nonadecene, eicosene or mixtures thereof and their dimers, trimers and tetramers are especially useful olefins. Alternatively, the olefin may be a Diels-Alder adduct of a diene such as 1,3-butadiene and an unsaturated ester, such as, butylacrylate.

Another class of sulfurized olefin includes sulfurized fatty acids and their esters. The fatty acids are often obtained from vegetable oil or animal oil and typically contain about 4 to about 22 carbon atoms. Examples of suitable fatty acids and their esters include triglycerides, oleic acid, linoleic acid, palmitoleic acid or mixtures thereof. Often, the fatty acids are obtained from lard oil, tall oil, peanut oil, soybean oil, cottonseed oil, sunflower seed oil or mixtures thereof. Fatty acids and/or ester may be mixed with olefins, such as α-olefins.

In another alternative embodiment the antioxidant composition also contains a molybdenum-containing antioxidant in addition to the phenolic and/or aminic antioxidants discussed above. When a combination of these three antioxidants is used, preferably the ratio of phenolic to aminic to molybdenum-containing is (0 to 2):(0 to 2):(0 to 1).

The one or more antioxidant(s) may be present in ranges about 0 wt. % to about 20 wt. %, or about 0.1 wt. % to about 10 wt. %, or about 1 wt. % to about 5 wt. %, of the lubricating oil composition.

Antiwear Agents

The lubricating oil compositions herein also may optionally contain one or more antiwear agents. Examples of suitable antiwear agents include, but are not limited to, a metal thiophosphate; a metal dialkyldithiophosphate; a phosphoric acid ester or salt thereof; a phosphate ester(s); a phosphite; a phosphorus-containing carboxylic ester, ether, or amide; a sulfurized olefin; thiocarbamate-containing compounds including, thiocarbamate esters, alkylene-coupled thiocarbamates, and bis(S-alkyldithiocarbamyl)disulfides; and mixtures thereof. A suitable antiwear agent may be a molybdenum dithiocarbamate. The phosphorus containing antiwear agents are more fully described in European Patent 612 839. The metal in the dialkyl dithio phosphate salts may be an alkali metal, alkaline earth metal, aluminum, lead, tin, molybdenum, manganese, nickel, copper, titanium, or zinc. A useful antiwear agent may be zinc dialkylthiophosphatedialkyldithiophosphate.

Further examples of suitable antiwear agents include titanium compounds, tartrates, tartrimides, oil soluble amine salts of phosphorus compounds, sulfurized olefins, phosphites (such as dibutyl phosphite), phosphonates, thiocarbamate-containing compounds, such as thiocarbamate esters, thiocarbamate amides, thiocarbamic ethers, alkylene-coupled thiocarbamates, and bis(S-alkyldithiocarbamyl) disulfides. The tartrate or tartrimide may contain alkyl-ester groups, where the sum of carbon atoms on the alkyl groups may be at least 8. The antiwear agent may in one embodiment include a citrate.

The antiwear agent may be present in ranges including about 0 wt. % to about 15 wt. %, or about 0.01 wt. % to about 10 wt. %, or about 0.05 wt. % to about 5 wt. %, or about 0.1 wt. % to about 3 wt. % of the lubricating oil composition.

Boron-Containing Compounds

The lubricating oil compositions herein may optionally contain one or more boron-containing compounds.

Examples of boron-containing compounds include borate esters, borated fatty amines, borated epoxides, borated detergents, and borated dispersants, such as borated succinimide dispersants, as disclosed in U.S. Pat. No. 5,883,057.

The boron-containing compound, if present, can be used in an amount sufficient to provide up to about 8 wt. %, about 0.01 wt. % to about 7 wt. %, about 0.05 wt. % to about 5 wt. %, or about 0.1 wt. % to about 3 wt. % of the lubricating oil composition.

Detergents

The lubricating oil composition may optionally further comprise one or more neutral, low based, or overbased detergents, and mixtures thereof. Suitable detergent substrates include phenates, sulfur containing phenates, sulfonates, calixarates, salixarates, salicylates, carboxylic acids, phosphorus acids, mono- and/or di-thiophosphoric acids, alkyl phenols, sulfur coupled alkyl phenol compounds, or methylene bridged phenols. Suitable detergents and their methods of preparation are described in greater detail in numerous patent publications, including U.S. Pat. No. 7,732,390 and references cited therein.

The detergent substrate may be salted with an alkali or alkaline earth metal such as, but not limited to, calcium, magnesium, potassium, sodium, lithium, barium, or mixtures thereof. In some embodiments, the detergent is free of barium. In some embodiments, a detergent may contain traces of other metals such as magnesium or calcium in amounts such as 50 ppm or less, 40 ppm or less, 30 ppm or less, 20 ppm or less, or 10 ppm or less. A suitable detergent may include alkali or alkaline earth metal salts of petroleum sulfonic acids and long chain mono- or di-alkylarylsulfonic acids with the aryl group being benzyl, tolyl, and xylyl. Examples of suitable detergents include, but are not limited to, calcium phenates, calcium sulfur containing phenates, calcium sulfonates, calcium calixarates, calcium salixarates, calcium salicylates, calcium carboxylic acids, calcium phosphorus acids, calcium mono- and/or di-thiophosphoric acids, calcium alkyl phenols, calcium sulfur coupled alkyl phenol compounds, calcium methylene bridged phenols, magnesium phenates, magnesium sulfur containing phenates, magnesium sulfonates, magnesium calixarates, magnesium salixarates, magnesium salicylates, magnesium carboxylic acids, magnesium phosphorus acids, magnesium mono- and/or di-thiophosphoric acids, magnesium alkyl phenols, magnesium sulfur coupled alkyl phenol compounds, magnesium methylene bridged phenols, sodium phenates, sodium sulfur containing phenates, sodium sulfonates, sodium calixarates, sodium salixarates, sodium salicylates, sodium carboxylic acids, sodium phosphorus acids, sodium mono- and/or di-thiophosphoric acids, sodium alkyl phenols, sodium sulfur coupled alkyl phenol compounds, or sodium methylene bridged phenols.

Overbased detergent additives are well known in the art and may be alkali or alkaline earth metal overbased detergent additives. Such detergent additives may be prepared by reacting a metal oxide or metal hydroxide with a substrate and carbon dioxide gas. The substrate is typically an acid, for example, an acid such as an aliphatic substituted sulfonic acid, an aliphatic substituted carboxylic acid, or an aliphatic substituted phenol.

The terminology "overbased" relates to metal salts, such as metal salts of sulfonates, carboxylates, and phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, MR, is greater than one. They are commonly referred to as overbased, hyperbased, or superbased salts and may be salts of organic sulfur acids, carboxylic acids, or phenols.

An overbased detergent of the lubricating oil composition may have a total base number (TBN) of about 200 mg KOH/gram or greater, or as further examples, about 250 mg KOH/gram or greater, or about 350 mg KOH/gram or greater, or about 375 mg KOH/gram or greater, or about 400 mg KOH/gram or greater.

Examples of suitable overbased detergents include, but are not limited to, overbased calcium phenates, overbased calcium sulfur containing phenates, overbased calcium sulfonates, overbased calcium calixarates, overbased calcium salixarates, overbased calcium salicylates, overbased calcium carboxylic acids, overbased calcium phosphorus acids, overbased calcium mono- and/or di-thiophosphoric acids, overbased calcium alkyl phenols, overbased calcium sulfur coupled alkyl phenol compounds, overbased calcium methylene bridged phenols, overbased magnesium phenates, overbased magnesium sulfur containing phenates, overbased magnesium sulfonates, overbased magnesium calixarates, overbased magnesium salixarates, overbased magnesium salicylates, overbased magnesium carboxylic acids, overbased magnesium phosphorus acids, overbased magnesium mono- and/or di-thiophosphoric acids, overbased magnesium alkyl phenols, overbased magnesium sulfur coupled alkyl phenol compounds, or overbased magnesium methylene bridged phenols.

The overbased calcium phenate detergents have a total base number of at least 150 mg KOH/g, at least about 225 mg KOH/g, at least 225 mg KOH/g to about 400 mg KOH/g, at least about 225 mg KOH/g to about 350 mg KOH/g or about 230 to about 350 mg KOH/g, all as measured by the method of ASTM D-2896. When such detergent compositions are formed in an inert diluent, e.g. a process oil, usually a mineral oil, the total base number reflects the basicity of the overall composition including diluent, and any other materials (e.g., promoter, etc.) that may be contained in the detergent composition.

The overbased detergent may have a metal to substrate ratio of from 1.1:1, or from 2:1, or from 4:1, or from 5:1, or from 7:1, or from 10:1.

In some embodiments, the lubricating oil composition does not contain a calcium phenate detergent and/or a calcium salicylate detergent.

In some embodiments, a detergent is effective at reducing or preventing rust in an engine.

The detergent may be present at about 0 wt. % to about 10 wt. %, or about 0.1 wt. % to about 8 wt. %, or about 1 wt. % to about 4 wt. %, or greater than about 4 wt. % to about 8 wt. %.

Dispersants

The lubricating oil composition may optionally further comprise one or more dispersants or mixtures thereof. Dispersants are often known as ashless-type dispersants because, prior to mixing in a lubricating oil composition, they do not contain ash-forming metals and they do not normally contribute any ash when added to a lubricant. Ashless type dispersants are characterized by a polar group attached to a relatively high molecular weight hydrocarbon chain. Typical ashless dispersants include N-substituted long chain alkenyl succinimides. Examples of N-substituted long chain alkenyl succinimides include polyisobutylene succinimide with number average molecular weight of the polyisobutylene substituent in the range about 350 to about 50,000, or to about 5,000, or to about 3,000. Succinimide dispersants and their preparation are disclosed, for instance in U.S. Pat. No. 7,897,696 or 4,234,435. The polyolefin may be prepared from polymerizable monomers containing about 2 to about 16, or about 2 to about 8, or about 2 to about 6 carbon atoms. Succinimide dispersants are typically the imide formed from a polyamine, typically a poly(ethyleneamine).

Preferred amines are selected from polyamines and hydroxyamines. Examples of polyamines that may be used include, but are not limited to, diethylene triamine (DETA), triethylene tetramine (TETA), tetraethylene pentamine (TEPA), and higher homologues such as pentaethylamine hexamine (PEHA), and the like.

A suitable heavy polyamine is a mixture of polyalkylenepolyamines comprising small amounts of lower polyamine oligomers such as TEPA and PEHA (pentaethylene hexamine) but primarily oligomers with 6 or more nitrogen atoms, 2 or more primary amines per molecule, and more extensive branching than conventional polyamine mixtures. A heavy polyamine preferably includes polyamine oligomers containing 7 or more nitrogens per molecule and with 2 or more primary amines per molecule. The heavy polyamine comprises more than 28 wt. % (e.g. >32 wt. %) total nitrogen and an equivalent weight of primary amine groups of 120-160 grams per equivalent.

Suitable polyamines are commonly known as PAM, and contain a mixture of ethylene amines where TEPA and pentaethylene hexamine (PEHA) are the major part of the polyamine, usually less than about 80 wt. %.

Typically PAM has 8.7-8.9 milliequivalents of primary amine per gram (an equivalent weight of 115 to 112 grams per equivalent of primary amine) and a total nitrogen content of about 33-34 wt. %. Heavier cuts of PAM oligomers with practically no TEPA and only very small amounts of PEHA but containing primarily oligomers with more than 6 nitrogens and more extensive branching, may produce dispersants with improved dispersancy.

In an embodiment the present disclosure further comprises at least one polyisobutylene succinimide dispersant derived from polyisobutylene with number average molecular weight in the range about 350 to about 50,000, or to about 5000, or to about 3000. The polyisobutylene succinimide may be used alone or in combination with other dispersants.

In some embodiments, polyisobutylene, when included, may have greater than 50 mol %, greater than 60 mol %, greater than 70 mol %, greater than 80 mol %, or greater than 90 mol % content of terminal double bonds. Such PIB is also referred to as highly reactive PIB ("HR-PIB"). HR-PIB having a number average molecular weight ranging from about 800 to about 5000 is suitable for use in embodiments of the present disclosure. Conventional PIB typically has less than 50 mol %, less than 40 mol %, less than 30 mol %, less than 20 mol %, or less than 10 mol % content of terminal double bonds.

An HR-PIB having a number average molecular weight ranging from about 900 to about 3000 may be suitable. Such HR-PIB is commercially available, or can be synthesized by the polymerization of isobutene in the presence of a non-chlorinated catalyst such as boron trifluoride, as described in U.S. Pat. No. 4,152,499 to Boerzel, et al. and U.S. Pat. No. 5,739,355 to Gateau, et al. When used in the aforementioned thermal ene reaction, HR-PIB may lead to higher conversion rates in the reaction, as well as lower amounts of sediment formation, due to increased reactivity. A suitable method is described in U.S. Pat. No. 7,897,696.

In one embodiment the present disclosure further comprises at least one dispersant derived from polyisobutylene succinic anhydride ("PIBSA"). The PIBSA may have an average of between about 1.0 and about 2.0 succinic acid moieties per polymer.

The wt. % actives of the alkenyl or alkyl succinic anhydride can be determined using a chromatographic technique. This method is described in column 5 and 6 in U.S. Pat. No. 5,334,321.

The percent conversion of the polyolefin is calculated from the wt. % actives using the equation in column 5 and 6 in U.S. Pat. No. 5,334,321.

In one embodiment, the dispersant may be derived from a polyalphaolefin (PAO) succinic anhydride.

In one embodiment, the dispersant may be derived from olefin maleic anhydride copolymer. As an example, the dispersant may be described as a poly-PIBSA.

In an embodiment, the dispersant may be derived from an anhydride which is grafted to an ethylene-propylene copolymer.

A suitable class of dispersants may be derived from olefin copolymers (OCP), more specifically, ethylene-propylene dispersants which may be grafted with maleic anhydride. A more complete list of nitrogen-containing compounds that can be reacted with the functionalized OCP are described in U.S. Pat. Nos. 7,485,603; 7,786,057; 7,253,231; 6,107,257; and 5,075,383; and/or are commercially available.

One class of suitable dispersants may be Mannich bases. Mannich bases are materials that are formed by the condensation of a higher molecular weight, alkyl substituted phenol, a polyalkylene polyamine, and an aldehyde such as formaldehyde. Mannich bases are described in more detail in U.S. Pat. No. 3,634,515.

A suitable class of dispersants may be high molecular weight esters or half ester amides.

A suitable dispersant may also be post-treated by conventional methods by a reaction with any of a variety of agents. Among these are boron, urea, thiourea, dimercaptothiadiazoles, carbon disulfide, aldehydes, ketones, carboxylic acids, hydrocarbon-substituted succinic anhydrides, maleic anhydride, nitriles, epoxides, carbonates, cyclic carbonates, hindered phenolic esters, and phosphorus compounds. U.S. Pat. Nos. 7,645,726; 7,214,649; and 8,048,831 are incorporated herein by reference in their entireties.

In addition to the carbonate and boric acids post-treatments both the compounds may be post-treated, or further post-treatment, with a variety of post-treatments designed to improve or impart different properties. Such post-treatments include those summarized in columns 27-29 of U.S. Pat. No. 5,241,003, hereby incorporated by reference. Such treatments include, treatment with:

Inorganic phosphorous acids or anhydrates (e.g., U.S. Pat. Nos. 3,403,102 and 4,648,980);

Organic phosphorous compounds (e.g., U.S. Pat. No. 3,502,677);

Phosphorous pentasulfides;

Boron compounds as already noted above (e.g., U.S. Pat. Nos. 3,178,663 and 4,652,387);

Carboxylic acid, polycarboxylic acids, anhydrides and/or acid halides (e.g., U.S. Pat. Nos. 3,708,522 and 4,948,386);

Epoxides polyepoxiates or thioepoxides (e.g., U.S. Pat. Nos. 3,859,318 and 5,026,495);

Aldehyde or ketone (e.g., U.S. Pat. No. 3,458,530);

Carbon disulfide (e.g., U.S. Pat. No. 3,256,185);

Glycidol (e.g., U.S. Pat. No. 4,617,137);

Urea, thourea or guanidine (e.g., U.S. Pat. Nos. 3,312,619; 3,865,813; and British Patent GB 1,065,595);

Organic sulfonic acid (e.g., U.S. Pat. No. 3,189,544 and British Patent GB 2,140,811);

Alkenyl cyanide (e.g., U.S. Pat. Nos. 3,278,550 and 3,366,569);

Diketene (e.g., U.S. Pat. No. 3,546,243);

A diisocyanate (e.g., U.S. Pat. No. 3,573,205);

Alkane sultone (e.g., U.S. Pat. No. 3,749,695);

1,3-Dicarbonyl Compound (e.g., U.S. Pat. No. 4,579,675);

Sulfate of alkoxylated alcohol or phenol (e.g., U.S. Pat. No. 3,954,639);

Cyclic lactone (e.g., U.S. Pat. Nos. 4,617,138; 4,645,515; 4,668,246; 4,963,275; and 4,971,711);

Cyclic carbonate or thiocarbonate linear monocarbonate or polycarbonate, or chloroformate (e.g., U.S. Pat. Nos. 4,612,132; 4,647,390; 4,648,886; 4,670,170);

Nitrogen-containing carboxylic acid (e.g., U.S. Pat. No. 4,971,598 and British Patent GB 2,140,811);

Hydroxy-protected chlorodicarbonyloxy compound (e.g., U.S. Pat. No. 4,614,522);

Lactam, thiolactam, thiolactone or ditholactone (e.g., U.S. Pat. Nos. 4,614,603 and 4,666,460);

Cyclic carbonate or thiocarbonate, linear monocarbonate or plycarbonate, or chloroformate (e.g., U.S. Pat. Nos. 4,612,132; 4,647,390; 4,646,860; and 4,670,170);

Nitrogen-containing carboxylic acid (e.g., U.S. Pat. No. 4,971,598 and British Patent GB 2,440,811);

Hydroxy-protected chlorodicarbonyloxy compound (e.g., U.S. Pat. No. 4,614,522);

Lactam, thiolactam, thiolactone or dithiolactone (e.g., U.S. Pat. Nos. 4,614,603, and 4,666,460);

Cyclic carbamate, cyclic thiocarbamate or cyclic dithiocarbamate (e.g., U.S. Pat. Nos. 4,663,062 and 4,666,459);

Hydroxyaliphatic carboxylic acid (e.g., U.S. Pat. Nos. 4,482,464; 4,521,318; 4,713,189);

Oxidizing agent (e.g., U.S. Pat. No. 4,379,064);

Combination of phosphorus pentasulfide and a polyalkylene polyamine (e.g., U.S. Pat. No. 3,185,647);

Combination of carboxylic acid or an aldehyde or ketone and sulfur or sulfur chloride (e.g., U.S. Pat. Nos. 3,390,086; 3,470,098);

Combination of a hydrazine and carbon disulfide (e.g. U.S. Pat. No. 3,519,564);

Combination of an aldehyde and a phenol (e.g., U.S. Pat. Nos. 3,649,229; 5,030,249; 5,039,307);

Combination of an aldehyde and an O-diester of dithiophosphoric acid (e.g., U.S. Pat. No. 3,865,740);

Combination of a hydroxyaliphatic carboxylic acid and a boric acid (e.g., U.S. Pat. No. 4,554,086);

Combination of a hydroxyaliphatic carboxylic acid, then formaldehyde and a phenol (e.g., U.S. Pat. No. 4,636,322);

Combination of a hydroxyaliphatic carboxylic acid and then an aliphatic dicarboxylic acid (e.g., U.S. Pat. No. 4,663,064);

Combination of formaldehyde and a phenol and then glycolic acid (e.g., U.S. Pat. No. 4,699,724);

Combination of a hydroxyaliphatic carboxylic acid or oxalic acid and then a diisocyanate (e.g. U.S. Pat. No. 4,713,191);

Combination of inorganic acid or anhydride of phosphorus or a partial or total sulfur analog thereof and a boron compound (e.g., U.S. Pat. No. 4,857,214);

Combination of an organic diacid then an unsaturated fatty acid and then a nitrosoaromatic amine optionally followed by a boron compound and then a glycolating agent (e.g., U.S. Pat. No. 4,973,412);

Combination of an aldehyde and a triazole (e.g., U.S. Pat. No. 4,963,278);

Combination of an aldehyde and a triazole then a boron compound (e.g., U.S. Pat. No. 4,981,492);

Combination of cyclic lactone and a boron compound (e.g., U.S. Pat. Nos. 4,963,275 and 4,971,711). The above mentioned patents are herein incorporated in their entireties.

The TBN of a suitable dispersant may be from about 10 to about 65 on an oil-free basis, which is comparable to about 5 to about 30 TBN if measured on a dispersant sample containing about 50 wt. % diluent oil.

The dispersant, if present, can be used in an amount sufficient to provide up to about 20 wt. %, based upon the final weight of the lubricating oil composition. Another amount of the dispersant that can be used may be about 0.1 wt. % to about 15 wt. %, or about 0.1 wt. % to about 10 wt. %, or about 3 wt. % to about 10 wt. %, or about 1 wt. % to about 6 wt. %, or about 7 wt. % to about 12 wt. %, based upon the final weight of the lubricating oil composition. In some embodiments, the lubricating oil composition utilizes a mixed dispersant system. A single type or a mixture of two or more types of dispersants in any desired ratio may be used.

Friction Modifiers

The lubricating oil compositions herein also may optionally contain one or more friction modifiers. Suitable friction modifiers may comprise metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanadine, alkanolamides, phosphonates, metal-containing compounds, glycerol esters, sulfurized fatty compounds and olefins, sunflower oil other naturally occurring plant or animal oils, dicarboxylic acid esters, esters or partial esters of a polyol and one or more aliphatic or aromatic carboxylic acids, and the like.

Suitable friction modifiers may contain hydrocarbyl groups that are selected from straight chain, branched chain, or aromatic hydrocarbyl groups or mixtures thereof, and may be saturated or unsaturated. The hydrocarbyl groups may be composed of carbon and hydrogen or hetero atoms such as sulfur or oxygen. The hydrocarbyl groups may range from about 12 to about 25 carbon atoms. In some embodiments the friction modifier may be a long chain fatty acid ester. In another embodiment the long chain fatty acid ester may be a mono-ester, or a di-ester, or a (tri)glyceride. The friction modifier may be a long chain fatty amide, a long chain fatty ester, a long chain fatty epoxide derivatives, or a long chain imidazoline.

Other suitable friction modifiers may include organic, ashless (metal-free), nitrogen-free organic friction modifiers. Such friction modifiers may include esters formed by reacting carboxylic acids and anhydrides with alkanols and generally include a polar terminal group (e.g. carboxyl or hydroxyl) covalently bonded to an oleophilic hydrocarbon chain. An example of an organic ashless nitrogen-free friction modifier is known generally as glycerol monooleate (GMO) which may contain mono-, di-, and tri-esters of oleic acid. Other suitable friction modifiers are described in U.S. Pat. No. 6,723,685, herein incorporated by reference in its entirety.

Aminic friction modifiers may include amines or polyamines. Such compounds can have hydrocarbyl groups that are linear, either saturated or unsaturated, or a mixture thereof and may contain from about 12 to about 25 carbon atoms. Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291, herein incorporated by reference in its entirety.

A friction modifier may optionally be present in ranges such as about 0 wt. % to about 10 wt. %, or about 0.01 wt. % to about 8 wt. %, or about 0.1 wt. % to about 4 wt. %.

Molybdenum-Containing Component

The lubricating oil compositions herein also may optionally contain one or more molybdenum-containing compounds. An oil-soluble molybdenum compound may have the functional performance of an antiwear agent, an antioxidant, a friction modifier, or mixtures thereof.

An oil-soluble molybdenum compound may include molybdenum dithiocarbamates, molybdenum dialkyldithiophosphates, molybdenum dithiophosphinates, amine salts of molybdenum compounds, molybdenum xanthates, molybdenum thioxanthates, molybdenum sulfides, molybdenum carboxylates, molybdenum alkoxides, a trinuclear organo-molybdenum compound, and/or mixtures thereof. The molybdenum sulfides include molybdenum disulfide. The molybdenum disulfide may be in the form of a stable dispersion. In one embodiment the oil-soluble molybdenum compound may be selected from the group consisting of molybdenum dithiocarbamates, molybdenum dialkyldithiophosphates, amine salts of molybdenum compounds, and mixtures thereof. In one embodiment the oil-soluble molybdenum compound may be a molybdenum dithiocarbamate.

Suitable examples of molybdenum compounds which may be used include commercial materials sold under the trade names such as Molyvan 822™, Molyvan™ A, Molyvan 2000™ and Molyvan 855™ from R. T. Vanderbilt Co., Ltd., and Sakura-Lube™ S-165, S-200, S-300, 5-310G, S-525, S-600, S-700, and S-710 available from Adeka Corporation, and mixtures thereof. Suitable molybdenum components are described in U.S. Pat. No. 5,650,381; U.S. RE 37,363 E1; U.S. RE 38,929 E1; and U.S. RE 40,595 E1, incorporated herein by reference in their entireties.

Additionally, the molybdenum compound may be an acidic molybdenum compound. Included are molybdic acid, ammonium molybdate, sodium molybdate, potassium molybdate, and other alkaline metal molybdates and other molybdenum salts, e.g., hydrogen sodium molybdate, $MoOCl_4$, $MoO_2Br_2$, $Mo_2O_3Cl_6$, molybdenum trioxide or similar acidic molybdenum compounds. Alternatively, the compositions can be provided with molybdenum by molybdenum/sulfur complexes of basic nitrogen compounds as described, for example, in U.S. Pat. Nos. 4,263,152; 4,285,822; 4,283,295; 4,272,387; 4,265,773; 4,261,843; 4,259,195 and 4,259,194; and WO 94/06897, incorporated herein by reference in their entireties.

Another class of suitable organo-molybdenum compounds are trinuclear molybdenum compounds, such as those of the formula $Mo_3S_kL_nQ_z$ and mixtures thereof, wherein S represents sulfur, L represents independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms may be present among all the ligands' organo groups, such as at least 25, at least 30, or at least 35 carbon atoms. Additional suitable molybdenum compounds are described in U.S. Pat. No. 6,723,685, herein incorporated by reference in its entirety.

The oil-soluble molybdenum compound may be present in the lubricating oil composition in an amount sufficient to provide about 0.5 ppm to about 2000 ppm, about 1 ppm to about 700 ppm, about 1 ppm to about 550 ppm, about 5 ppm to about 300 ppm, or about 20 ppm to about 250 ppm of molybdenum.

Transition Metal-Containing Compounds

In another embodiment, the oil-soluble compound may be a transition metal containing compound or a metalloid. The transition metals may include, but are not limited to, titanium, vanadium, copper, zinc, zirconium, molybdenum, tantalum, tungsten, and the like. Suitable metalloids include, but are not limited to, boron, silicon, antimony, tellurium, and the like.

In an embodiment, an oil-soluble transition metal-containing compound may function as antiwear agents, friction modifiers, antioxidants, deposit control additives, or more than one of these functions. In an embodiment the oil-soluble transition metal-containing compound may be an oil-soluble titanium compound, such as a titanium (IV) alkoxide. Among the titanium containing compounds that may be used in, or which may be used for preparation of the oils-soluble materials of, the disclosed technology are various Ti (IV) compounds such as titanium (IV) oxide; titanium (IV) sulfide; titanium (IV) nitrate; titanium (IV) alkoxides such as titanium methoxide, titanium ethoxide, titanium propoxide, titanium isopropoxide, titanium butoxide, titanium 2-ethylhexoxide; and other titanium compounds or complexes including but not limited to titanium phenates; titanium carboxylates such as titanium (IV) 2-ethyl-1-3-hexanedioate or titanium citrate or titanium oleate; and titanium (IV) (triethanolaminato)isopropoxide. Other forms of titanium encompassed within the disclosed technology include titanium phosphates such as titanium dithiophosphates (e.g., dialkyldithiophosphates) and titanium sulfonates (e.g., alkylbenzenesulfonates), or, generally, the reaction product of titanium compounds with various acid materials to form salts, such as oil-soluble salts. Titanium compounds can thus be derived from, among others, organic acids, alcohols, and glycols. Ti compounds may also exist in dimeric or oligomeric form, containing Ti—O—Ti structures. Such titanium materials are commercially available or can be readily prepared by appropriate synthesis techniques which will be apparent to the person skilled in the art. They may exist at room temperature as a solid or a liquid, depending on the particular compound. They may also be provided in a solution form in an appropriate inert solvent.

In one embodiment, the titanium can be supplied as a Ti-modified dispersant, such as a succinimide dispersant. Such materials may be prepared by forming a titanium mixed anhydride between a titanium alkoxide and a hydrocarbyl-substituted succinic anhydride, such as an alkenyl-(or alkyl) succinic anhydride. The resulting titanate-succinate intermediate may be used directly or it may be reacted with any of a number of materials, such as (a) a polyamine-based succinimide/amide dispersant having free, condensable —NH functionality; (b) the components of a polyamine-based succinimide/amide dispersant, i.e., an alkenyl- (or alkyl-) succinic anhydride and a polyamine, (c) a hydroxy-containing polyester dispersant prepared by the reaction of a substituted succinic anhydride with a polyol, aminoalcohol, polyamine, or mixtures thereof. Alternatively, the titanate-succinate intermediate may be reacted with other agents such as alcohols, aminoalcohols, ether alcohols, polyether alcohols or polyols, or fatty acids, and the product thereof either used directly to impart Ti to a lubricant, or else further reacted with the succinic dispersants as described above. As an example, 1 part (by mole) of tetraisopropyl titanate may be reacted with about 2 parts (by mole) of a polyisobutene-substituted succinic anhydride at 140-150° C. for 5 to 6 hours to provide a titanium modified dispersant or intermediate. The resulting material (30 g) may be further reacted with a succinimide dispersant from polyisobutene-substituted succinic anhydride and a polyethylenepolyamine mixture (127 grams+diluent oil) at 150° C. for 1.5 hours, to produce a titanium-modified succinimide dispersant.

Another titanium containing compound may be a reaction product of titanium alkoxide and $C_6$ to $C_{25}$ carboxylic acid. The reaction product may be represented by the following formula:

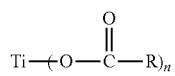

wherein n is an integer selected from 2, 3 and 4, and R is a hydrocarbyl group containing from about 5 to about 24 carbon atoms, or by the formula:

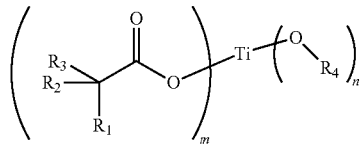

wherein m+n=4 and n ranges from 1 to 3, $R_4$ is an alkyl moiety with carbon atoms ranging from 1-8, $R_1$ is selected from a hydrocarbyl group containing from about 6 to 25 carbon atoms, and $R_2$ and $R_3$ are the same or different and are selected from a hydrocarbyl group containing from about 1 to 6 carbon atoms, or by the formula:

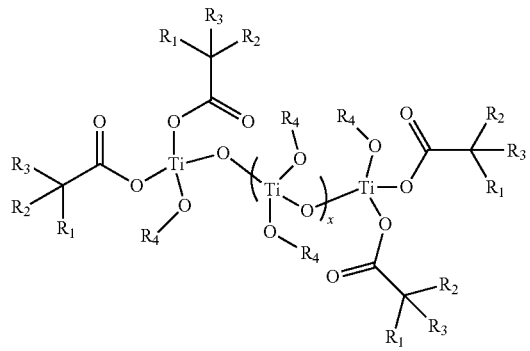

wherein x ranges from 0 to 3, $R_1$ is selected from a hydrocarbyl group containing from about 6 to 25 carbon atoms, $R_2$, and $R_3$ are the same or different and are selected from a hydrocarbyl group containing from about 1 to 6 carbon atoms, and $R_4$ is selected from a group consisting of either H, or $C_6$ to $C_{25}$ carboxylic acid moiety.

Suitable carboxylic acids may include, but are not limited to caproic acid, caprylic acid, lauric acid, myristic acid, palmitic acid, stearic acid, arachidic acid, oleic acid, erucic acid, linoleic acid, linolenic acid, cyclohexanecarboxylic acid, phenylacetic acid, benzoic acid, neodecanoic acid, and the like.

In an embodiment the oil soluble titanium compound may be present in the lubricating oil composition in an amount to provide from 0 to 3000 ppm titanium by weight or 25 to about 1500 ppm titanium by weight or about 35 ppm to 500 ppm titanium by weight or about 50 ppm to about 300 ppm.

Additional Viscosity Index Improver

The lubricating oil compositions herein also may optionally contain an additional viscosity index improvers. Suitable viscosity index improvers may include polyolefins, olefin copolymers, ethylene/propylene copolymers, polyisobutenes, hydrogenated styrene-isoprene polymers, styrene/maleic ester copolymers, hydrogenated styrene/butadiene copolymers, hydrogenated isoprene polymers, alpha-olefin maleic anhydride copolymers, polymethacrylates, polyacrylates, polyalkyl styrenes, hydrogenated alkenyl aryl conjugated diene copolymers, or mixtures thereof. The additional viscosity index improvers may include star polymers and suitable examples are described in US Publication No. 2012/0101017A1.

The lubricating oil compositions herein also may optionally contain one or more dispersant viscosity index improvers or additional viscosity index improvers in addition to the viscosity index improver of the present invention. Suitable viscosity index improvers may include functionalized polyolefins, for example, ethylene-propylene copolymers that have been functionalized with the reaction product of an acylating agent (such as maleic anhydride) and a polyamine; polymethacrylates functionalized with an amine, or esterified maleic anhydride-styrene copolymers reacted with an amine.

The total amount of additional viscosity index improver and/or dispersant viscosity index improver may be about 0 wt. % to about 20 wt. %, about 0.1 wt. % to about 15 wt. %, about 0.1 wt. % to about 12 wt. %, or about 0.5 wt. % to about 10 wt. %, of the lubricating oil composition.

Other Optional Additives

Other additives may be selected to perform one or more functions required of a lubricating fluid. Further, one or more of the mentioned additives may be multi-functional and provide functions in addition to or other than the function prescribed herein.

A lubricating oil composition according to the present disclosure may optionally comprise other performance additives. The other performance additives may be in addition to specified additives of the present disclosure and/or may comprise one or more of metal deactivators, viscosity index improvers, detergents, ashless TBN boosters, friction modifiers, antiwear agents, corrosion inhibitors, rust inhibitors, dispersants, dispersant viscosity index improvers, extreme pressure agents, antioxidants, foam inhibitors, demulsifiers, emulsifiers, pour point depressants, seal swelling agents and mixtures thereof. Typically, fully-formulated lubricating oil will contain one or more of these performance additives.

Suitable metal deactivators may include derivatives of benzotriazoles (typically tolyltriazole), dimercaptothiadiazole derivatives, 1,2,4-triazoles, benzimidazoles, 2-alkyldithiobenzimidazoles, or 2-alkyldithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides.

Suitable foam inhibitors include silicon-based compounds, such as siloxane.

Suitable pour point depressants may include a polymethylmethacrylates or mixtures thereof. Pour point depressants may be present in an amount sufficient to provide from about 0 wt. % to about 1 wt. %, about 0.01 wt. % to about 0.5 wt. %, or about 0.02 wt. % to about 0.04 wt. % based upon the final weight of the lubricating oil composition.

Suitable rust inhibitors may be a single compound or a mixture of compounds having the property of inhibiting corrosion of ferrous metal surfaces. Non-limiting examples of rust inhibitors useful herein include oil-soluble high molecular weight organic acids, such as 2-ethylhexanoic acid, lauric acid, myristic acid, palmitic acid, oleic acid, linoleic acid, linolenic acid, behenic acid, and cerotic acid, as well as oil-soluble polycarboxylic acids including dimer and trimer acids, such as those produced from tall oil fatty acids, oleic acid, and linoleic acid. Other suitable corrosion inhibitors include long-chain alpha, omega-dicarboxylic acids in the molecular weight range of about 600 to about 3000 and alkenylsuccinic acids in which the alkenyl group contains about 10 or more carbon atoms such as, tetrapropenylsuccinic acid, tetradecenylsuccinic acid, and hexadecenylsuccinic acid. Another useful type of acidic corrosion inhibitors are the half esters of alkenyl succinic acids having about 8 to about 24 carbon atoms in the alkenyl group with alcohols such as the polyglycols. The corresponding half amides of such alkenyl succinic acids are also useful. A useful rust inhibitor is a high molecular weight organic acid. In some embodiments, an engine oil is devoid of a rust inhibitor.

The rust inhibitor, if present, can be used in an amount sufficient to provide about 0 wt. % to about 5 wt. %, about 0.01 wt. % to about 3 wt. %, about 0.1 wt. % to about 2 wt. %, based upon the final weight of the lubricating oil composition.

In general terms, a suitable lubricant composition may include additive components in the ranges listed in the following table.

TABLE 4

| Component | Wt. % (Suitable Embodiments) | Wt. % (Preferred Embodiments) |
|---|---|---|
| Dispersant(s) | 0.1-20.0 | 1.0-10.0 |
| Antioxidant(s) | 0.1-5.0 | 0.01-3.0 |
| Detergent(s) | 0.0-15.0 | 0.2-8.0 |
| Ashless TBN booster(s) | 0.0-1.0 | 0.01-0.5 |
| Corrosion inhibitor(s) | 0.0-5.0 | 0.0-2.0 |
| Metal dihydrocarbyl dithiophosphate(s) | 0.1-6.0 | 0.1-4.0 |
| Ash-free phosphorus compound(s) | 0.0-6.0 | 0.0-4.0 |
| Antifoaming agent(s) | 0.0-5.0 | 0.001-0.15 |
| Antiwear agent(s) | 0.0-1.0 | 0.0-0.8 |
| Pour point depressant(s) | 0.0-5.0 | 0.01-1.5 |
| Viscosity index improver(s) | 0.01-20.0 | 0.1-10.0 |
| Dispersant viscosity index improver(s) | 0.0-10.0 | 0.0-5.0 |
| Friction modifier(s) | 0.01-5.0 | 0.05-2.0 |
| Base oil(s) | Balance | Balance |
| Total | 100 | 100 |

The percentages of each component above represent the weight percent of each component, based upon the weight of the total final lubricating oil composition. The balance of the lubricating oil composition consists of one or more base oils.

Additives used in formulating the compositions described herein may be blended into the base oil individually or in various sub-combinations. However, it may be suitable to blend all of the components concurrently using an additive concentrate (i.e., additives plus a diluent, such as a hydrocarbon solvent).

Fully formulated lubricants conventionally contain an additive package, referred to herein as a dispersant/inhibitor package or DI package, that will supply the characteristics that are required in the formulations. Suitable DI packages are described for example in U.S. Pat. Nos. 5,204,012 and 6,034,040 for example. Among the types of additives included in the additive package may be dispersants, seal swell agents, antioxidants, foam inhibitors, lubricity agents, rust inhibitors, corrosion inhibitors, demulsifiers, viscosity index improvers, and the like. Several of these components are well known to those skilled in the art and are generally used in conventional amounts with the additives and compositions described herein.

In all of the embodiments described herein, the lubricant or additive composition may further comprise one or more of detergents, dispersants, friction modifiers, antioxidants, rust inhibitors, viscosity index improvers, emulsifiers, demulsifiers, corrosion inhibitors, antiwear agents, metal dihydrocarbyl dithiophosphates, ash-free amine phosphate salts, antifoam agents, and pour point depressants and any combination thereof.

EXAMPLES

The following examples are illustrative, but not limiting, of the methods and compositions of the present disclosure. Other suitable modifications and adaptations of the variety of conditions and parameters normally encountered in the field, and which are obvious to those skilled in the art, are within the spirit and scope of the disclosure. All patents and publications cited herein are fully incorporated by reference herein in their entirety. Examples 1-7 exemplify different lubricating compositions comprising viscosity index improvers comprising ethylene units and propylene units reacted to branched alcohols or branched amines and processes for producing them.

Example 1

Reaction of 2-Dodecylhexadecanol with an Acylated Olefin Copolymer
(1:1 Molar Ratio of Alcohol Groups to Reactive Carboxyl Groups)

A 500 mL 4 neck resin kettle was equipped with a heating mantle, a pitched 3 blade overhead stirrer, a thermocouple, a nitrogen inlet, a nitrogen outlet and a condenser. An acylated ethylene-propylene copolymer with number average molecular weight of 56,000 g/mol (60 g, 0.41 carboxylic groups/1000 Mn), and Pure Performance® 110N base oil (Phillips66) (529.62 g) were added to the kettle. The reaction mixture was heated to 150° C. at a constant stir rate of 300 rpm and under active nitrogen flow for 6 hours to allow the acylated olefin copolymer to completely dissolve. The mixture was then maintained at 120° C. at 120 rpm overnight and under constant nitrogen flow. The following day, the temperature was increased to 170° C., and while mixing at 300 rpm, 2-dodecylhexadecanol was added (10.38 g, 25.24 mmoles). After 3 hours, Surfonic® L24-2 (18.0 g) was added to the reaction mixture and the reaction mixture was held at 170° C. for an additional 2 hours. The reaction mixture was allowed to cool to 130° C. and was filtered through a 100 mesh (140 μm) filter. The product was allowed to cool to room temperature and was subsequently tested for tribological and viscometric properties.

Example 2

Reacting 2-Dodecylhexadecanol an Acylated Olefin Copolymer
(1:2 Molar Ratio of Alcohol Groups to Reactive Carboxyl Groups)

The composition of Example 2 was prepared in a similar manner to Example 1, except that 516.83 g of Pure Performance® 110N base oil were added to the kettle in the first step, and 5.19 g (12.62 moles) 2-dodecylhexadecanol was added later. The product was allowed to cool to room temperature and was subsequently tested for tribological and viscometric properties.

Example 3

Reacting 2-Hexyldecanol with an Acylated Olefin Copolymer
(1:2 Molar Ratio of Alcohol Groups to Reactive Carboxyl Groups)

The composition of Example 3 was prepared in a similar manner to Example 1, except that 516.82 g Pure Performance® 110N base oil were added to the kettle in the first step and instead of 2-dodecylhexadecanol, 3.07 g (12.66 moles) of 2-hexyldecanol was employed. The product was allowed to cool to room temperature and was subsequently tested for tribological and viscometric properties.

Example 4

Reacting 2-Hexyloctanol with an Acylated Olefin Copolymer
(1:2 Molar Ratio of Alcohol Groups to Reactive Carboxyl Groups)

The composition of Example 4 was prepared in a similar manner to Example 1 except that 519.26 g Pure Performance® 110N base oil were added to the kettle in the first step and instead of 2-dodecylhexadecanol, 2.74 g (12.78 moles) of 2-hexyloctanol was added. The product was allowed to cool to room temperature and was subsequently tested for tribological and viscometric properties.

Example 5

Reacting 2-ethyl-1-hexylamine with an Acylated Olefin Copolymer
(1:2 Molar Ratio of Amine Groups to Reactive Carboxyl Groups)

A 500 mL 4 neck resin kettle was equipped with a heating mantle a pitched 3 blade overhead stirrer, a thermocouple, a nitrogen inlet, a nitrogen outlet and a condenser. An acylated ethylene-propylene copolymer with number average molecular weight of 56,000 g/mol (72 g, 0.41 carboxylic groups/1000 Mn) and Pure Performance® 110N base oil (520.08 g) were added to the kettle. The reaction mixture was heated to 150° C. at a constant stir rate of 300 rpm under active nitrogen flow for 6 hours to allow the acylated olefin copolymer to completely dissolve. The reaction mixture was then maintained at 120° C. at 120 rpm overnight and under constant nitrogen flow. The following day, the temperature was increased to 160° C., and while stirring at 300 rpm, 2-ethyl-1-hexylamine was added (1.9 g, 14.70 mmoles). After 4 hours, Surfonic® L24-2 (9.0 g) was added to the reaction mixture and the reaction mixture was held at 160° C. for an additional hour. The reaction mixture was allowed to cool to 130° C. and was filtered through a 100 mesh (140 μm) filter. The product was allowed to cool to room temperature and was subsequently tested for tribological and viscometric properties.

Example 6

Reacting Dioctylamine with an Acylated Olefin Copolymer
(1:1 Molar Ratio of Amine Groups to Reactive Carboxyl Groups)

A 500 mL 4 neck resin kettle was equipped with a heating mantle a pitched 3 blade overhead stirrer, a thermocouple, a nitrogen inlet, a nitrogen outlet and a condenser. An acylated ethylene-propylene copolymer with number average molecular weight of 56,000 g/mol (60 g, 0.41 carboxylic groups/1000Mn) and Pure Performance® 110N base oil (515.5 g) were added to the kettle. The reaction was heated to 150° C. at a constant stir rate of 300 rpm under active nitrogen flow for 6 hours to allow the acylated olefin copolymer to dissolve. The mixture was then maintained at 120° C. at 120 rpm overnight and under constant nitrogen flow. The following day, the temperature was increased to 165° C., and while mixing at 300 rpm, dioctylamine was added (6.5 g, 26.91 mmoles). After 3 hours, Surfonic® L24-2 (18.0 g) was added to the reaction mixture and held at 165° C. for 2 additional hours. The reaction mixture was allowed to cool to 130° C. and was filtered through a 100 mesh (140 μm) filter. The product was allowed to cool to room temperature and was subsequently tested for tribological and viscometric properties.

Example 7

Reacting bis-2-ethyl-1-hexylamine to an Acylated Olefin Copolymer
(1:2 Molar Ratio of Amine Groups to Reactive Carboxyl Groups)

Example 7 was prepared in a similar manner to Example 6 except that 518.45 g of Pure Performance® 110N base oil were added in the kettle in the first step and instead of dioctylamine, 3.55 g (14.7 mmoles) of bis-2-ethyl-1-hexylamine was added. The product was allowed to cool to room temperature and tested for tribological and viscometric properties.

The resulting polymers from examples 1-7 were subjected to two dissolution iterations comprising one equivalent weight of heptane addition followed by precipitation of ten equivalents of acetone. The polymer was thoroughly dried of acetone and drying was finished in vacuo. The grafting efficiency was characterized by changes in the IR spectra, number average molecular weight and nitrogen content of the polymers.

Comparative Example 1—25 SSI Olefin Copolymer Viscosity Index Improver

HiTEC® 5748A is a commercially available olefin copolymer viscosity index improver from Afton Chemical Corporation which is recommended for use in industrial, gasoline and diesel crankcase lubricants, particularly when excellent shear stability is desired. HiTEC® 5748A was employed in Comparative Example 1 and compared to other formulations mentioned in Table 5 below.

Mini Traction Machine

Thin film friction (TFF) was measured on a mini-traction machine (MTM). The TFF test measures thin-film lubrication regime traction coefficients using a Mini-Traction Machine (MTM) from PCS Instruments. These traction coefficients were measured at 130° C. with an applied load of 50N between an ANSI 52100 steel disk and an ANSI 52100 steel ball as oil was being pulled through the contact zone at an entrainment speed of 500 mm/s. a slide-to-roll ratio of 50% between the ball and disk was maintained during the measurements.

TABLE 5

| Polymer | TFF Traction Coefficient |
| --- | --- |
| Example 1 | 0.061 |
| Example 3 | 0.047 |
| Example 4 | 0.057 |
| Example 5 | 0.055 |
| Example 6 | 0.048 |
| Example 7 | 0.049 |
| Comparative Example 1 | 0.064 |

Comparative Example 1 showed a higher coefficient of friction than the other prepared inventive examples, with a TFF coefficient of 0.064. On the other hand, all of the inventive examples exhibited an improved friction performance, and the compositions of Examples 3, 6, and 7 exhibited the best overall performance.

Finished oil formulations were prepared using Examples 1-7 and Comparative Example 1 which comprised proportional base oil ratios to assess viscometric contributions of the invention compositions. The following additive package was included in each of the finished oil formulations.

TABLE 6

| DI Additive Package | |
| --- | --- |
| Component Name | wt. % |
| Dispersant | 4.5 |
| Diluent Oil | 0.4740 |
| Defoamer | 0.006 |
| Detergent | 1.55 |
| Antioxidant | 1.2 |
| Anti-wear Agent | 1.12 |
| Friction Modifier | 0.45 |
| Pour Point Depressant | 0.2 |
| Total Treat | 9.50 |

The polymer treat rate was varied depending on the amount of the polymer needed to reach the target $KV_{100}$. In general, the amount of polymer used ranged from 0.49 to 1.01 wt. %, based on the total weight of the finished oil composition.

Each of the formulations were tested for cold weather performance (CCS), kinematic viscosity at 100° C. and 40° C., Low-Temperature Pumping Viscosity (MRV-35), high temperature high shear viscosity (TBS) and low temperature high shear viscosity (ASTM-D6616 (TBS)). ASTM-D6616 is a high shear viscosity test performed at 100° C. while the TBS is a high shear viscosity test conducted at 150° C. The Cold Crank Simulator (CCS) test is a measure of cold weather performance and this test was carried out according to the method of ASTM D5293 at −30° C.

TABLE 7

| | 1 | 2 | 3 | 4 | 5 | 6 | 7 | CE 1 |
| --- | --- | --- | --- | --- | --- | --- | --- | --- |
| Molar Ratio* | (1:1) | (1:2) | (1:2) | (1:2) | (1:2) | (1:1) | (1:2) | — |
| KV100° C. (cSt) | 10.57 | 10.83 | 10.60 | 10.12 | 10.82 | 11.18 | 10.82 | 11.07 |
| KV40° C. (cSt) | 66.22 | 66.44 | 65.74 | 61.20 | 67.07 | 70.14 | 67.43 | 68.51 |
| CCS-30 (cP) | 6641 | 6574 | 6635 | 6523 | 6684 | 6913 | 6715 | 7558 |
| MRV-35 (cP) | 31400 | 35500 | 33000 | 28300 | 32400 | 33900 | 31000 | 29200 |
| TBS 150° C. (cP) | 2.97 | 2.94 | 2.81 | 2.73 | 2.99 | 3.04 | 2.85 | 3.31 |
| D6616-TBS 100° C. (cP) | 6.51 | 6.43 | 6.35 | 6.09 | 6.68 | 6.58 | 6.5 | 7.68 |
| Viscosity Index | 148 | 154 | 151 | 153 | 152 | 151 | 151 | 154 |

*The molar ratio is the molar ratio of either amine or alcohol groups to the reactive carboxyl groups.

In general, the cold cranking temperature performance was improved when compared to the polymer used in comparative example 1. Improvement in the cold cranking temperature performance ranged from 8.5% to 13.7%. In particular, example 2, showed the best overall performance, i.e. a low CCS and good TBS satisfying the SAE J300 criteria. It shows that using the inventive polymer can effectively convert a failing 5W-30 formulation into a passing 5W-30 formulation by changing the viscosity index improver.

Other embodiments of the present disclosure will be apparent to those skilled in the art from consideration of the specification and practice of the embodiments disclosed herein. As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the disclosure being indicated by the following claims.

The foregoing embodiments are susceptible to considerable variation in practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

It is to be understood that each component, compound, substituent or parameter disclosed herein is to be interpreted as being disclosed for use alone or in combination with one or more of each and every other component, compound, substituent or parameter disclosed herein.

It is also to be understood that each amount/value or range of amounts/values for each component, compound, substituent or parameter disclosed herein is to be interpreted as also being disclosed in combination with each amount/value or range of amounts/values disclosed for any other component(s), compounds(s), substituent(s) or parameter(s) disclosed herein and that any combination of amounts/values or ranges of amounts/values for two or more component(s), compounds(s), substituent(s) or parameters disclosed herein are thus also disclosed in combination with each other for the purposes of this description.

It is further understood that each range disclosed herein is to be interpreted as a disclosure of each specific value within the disclosed range that has the same number of significant digits. Thus, a range of from 1-4 is to be interpreted as an express disclosure of the values 1, 2, 3 and 4.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

What is claimed is:

1. A viscosity index improver comprising a reaction product of
   (i) an acylated copolymer obtainable by acylating, with an acylating agent, a copolymer of ethylene and one or more $C_3$-$C_{10}$ alpha-olefins having a number average molecular weight of 3,000 g/mol to 250,000 g/mol as measured by GPC,
   wherein an ethylene content of the copolymer of ethylene and one or more $C_3$-$C_{10}$ alpha-olefins is 10 mol % to 70 mol % and the $C_3$-$C_{10}$ alpha-olefin content of the copolymer of ethylene and one or more $C_3$-$C_{10}$ alpha-olefins includes at least 40 mol % of propylene when the one or more $C_3$-$C_{10}$ alpha-olefins comprises propylene; and
   (ii) a compound selected from one or more compounds of the formulae (III)-(V):

(III)

wherein $R_6$ is selected from a hydrogen and a linear or branched alkyl or alkenyl group, and $R_7$ is a linear or branched alkyl or alkenyl group, and a sum of a number of carbon atoms of $R_6$ and $R_7$ is from 7 to 31;

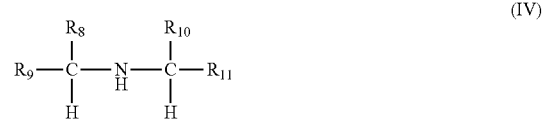

(IV)

wherein $R_8$, $R_9$ and $R_{10}$ are independently selected from a hydrogen and a linear or branched alkyl or alkenyl group; and $R_{11}$ is selected from a linear or branched alkyl or alkenyl group, and a sum of a number of carbon atoms of $R_8$, $R_9$, $R_{10}$ and $R_{11}$ is from 6 to 30; and

(V)

wherein $R_{13}$, $R_{14}$, $R_{16}$, and $R_{17}$ are independently selected from a linear or branched alkyl or alkenyl group; $R_{12}$ and $R_{15}$ are independently selected from hydrogen and a linear or branched alkyl or alkenyl group, a sum of a number of carbon atoms of $R_{12}$, $R_{13}$, $R_{14}$, $R_{15}$, $R_{16}$ and $R_{17}$ is from 6 to 30, and only one of $R_{12}$ and $R_{15}$ can be hydrogen; and the alkyl or alkenyl groups of the compounds of the formulae (III)-(V) are optionally substituted with one or more of halo groups, alkoxy groups, mercapto groups, nitro groups, nitroso groups, sulfoxy groups, pyridyl groups, furyl groups, thienyl groups, imidazolyl groups, and sulfur, and no more than two non-hydrocarbon substituents are present for every ten carbon atoms in the alkyl or alkenyl group, and the ratio of moles of amine per mole of carboxyl groups of the acylated polymer, is from 0.25:1 to 4:1.

2. The viscosity index improver of claim 1, wherein one or more of $R_7$, $R_{11}$, and $R_{13}$ is an alkyl group or an alkenyl group that provides branching at one or more of an alpha and a beta carbon atom of the compound (ii).

3. The viscosity index improver of claim 1, wherein one or more of $R_7$, $R_{11}$, and $R_{13}$ is an alkyl group or an alkenyl group that provides branching at at least an alpha carbon atom of the compound (ii).

4. The viscosity index improver of claim 1, wherein one or more of $R_7$, $R_{11}$, and $R_{13}$ is an alkyl group or an alkenyl group that provides branching at at least a beta carbon atom of the compound (ii).

5. The viscosity index improver of claim 1, wherein the compound (ii) is a compound of the formula (III) and $R_6$ is a linear or branched alkyl or alkenyl group.

6. The viscosity index improver of claim 1, wherein the compound (ii) is a compound of the formula (IV), and $R_9$ and $R_{11}$ are independently selected from a branched alkyl group and a branched alkenyl group.

7. The viscosity index improver of claim 1, wherein the compound (ii) is a compound of the formula (V) and at least one of $R_{12}$, $R_{13}$, and $R_{14}$ is a branched alkyl group or branched alkenyl group, and at least one of $R_{15}$, $R_{16}$, and $R_{17}$ is a branched alkyl group or branched alkenyl group.

8. The viscosity index improver of claim 4, wherein the at least one group that provides beta branching is a $C_2$-$C_{17}$ alkyl or alkenyl group.

9. The viscosity index improver of claim 8, wherein the compound (ii) is a primary amine.

10. The viscosity index improver of claim 4, wherein the compound (ii) is a secondary amine and the at least one group that provides beta branching is a $C_8$-$C_{18}$ alkyl or alkenyl group.

11. The viscosity index improver of claim 1, wherein the compound (ii) is selected from 2-ethyl-1-hexylamine, 2-butyl-1-octylamine, 2-hexyl-1-decamine, 2-octyl-1-dodecylamine, 2-decyl-1-tetradecamine, 2-dodecyl-1-hexadecamine, and 2-tetradecyl-1-octadecamine.

12. The viscosity index improver of claim 1, wherein the compound (ii) is selected from dioctylamine, 2-ethyl-1-hexylamine and bis(2-ethyl-1-hexyl)amine.

13. The viscosity index improver of claim 1, wherein the compound (ii) is a compound of the Formulae (III)-(V) and one or more of $R_7$, $R_{11}$, and $R_{13}$ is a linear alkyl group or a linear alkenyl group attached to provide branching at a β carbon atom of the compound (ii).

14. The viscosity index improver of claim 1, wherein the acylating agent is an ethylenically unsaturated acylating agent having at least one carboxylic acid or carboxylic anhydride group.

15. The viscosity index improver of claim 1, wherein the acylating agent is at least one selected from the group consisting of maleic acid, fumaric acid, itaconic acid, citraconic acid, cyclohex-4-ene-1,2-di-carboxylic acid, bicyclo[2.2.1]hept-5-ene-2,3-dicarboxylic acid, maleic anhydride, itaconic anhydride, citraconic anhydride, allylsuccinic anhydride, 4-methylcyclohex-4-ene-1,2-dicarboxylic anhydride and bicyclo[2.2.1]hept-5-ene-2,3-dicarboxylic anhydride.

16. The viscosity index improver of claim 1, wherein the acylating agent is maleic anhydride.

17. The viscosity index improver of claim 1, wherein the ratio of moles of amine per mole of carboxyl groups of the acylated polymer, is from 0.5:1 to 2:1.

18. The viscosity index improver of claim 1, wherein the acylated copolymer has acyl groups present in an amount of 0.3 weight percent to less than 30 weight percent, based on a total weight of the acylated copolymer.

19. The viscosity index improver of claim 1, wherein the acylated copolymer has acyl groups present in an amount of 0.5 wt. % to 5 wt. %, based on a total weight of the acylated copolymer.

20. The viscosity index improver of claim 1, wherein the acylated copolymer has 0.1 to 0.8 acyl groups per 1000 number average molecular weight units of the ethylene/$C_3$-$C_{10}$ alpha-olefin copolymers.

21. The viscosity index improver of claim 1, wherein the copolymer of ethylene and one or more $C_3$-$C_{10}$ alpha-olefins has a polydispersity index of less than or equal to 4 and an average ethylene derived unit run length ($n_{C2}$) which is less than 2.6, as determined by $^{13}C$ NMR spectroscopy, the average ethylene derived unit run length $n_{c2}$ is defined as the total number of ethylene-derived units in the copolymer divided by a number of runs of one or more sequential ethylene-derived units in the copolymer, and the average ethylene derived unit run length $n_{c2}$ also satisfies the relationship shown by the expression below:

$$n_{C2} < \frac{(EEE + EEA + AEA)}{(AEA + 0.5EEA)}$$

wherein
$EEE = (x_{C2})^3$
$EEA = 2(x_{C2})^2(1-x_{C2})$
$AEA = x_{C2}(1-x_{C2})^2$ $x_{C2}$ being a mole fraction of ethylene incorporated in the copolymer as measured by $^1H$-NMR spectroscopy, E representing an ethylene unit, and A representing a $C_3$-$C_{10}$ alpha olefin unit.

22. The viscosity index improver of claim 21, wherein less than 20% of unit triads in the copolymer are ethylene-ethylene-ethylene triads.

23. A lubricating oil composition comprising:
greater than 50 wt. % of a base oil, based on the total weight of the lubricating oil composition, and
0.1 wt. % to 20 wt. %, based on the total weight of the lubricating oil composition, of a viscosity index improver as claimed in claim 1.

24. The lubricating oil composition of claim 23, wherein the lubricating oil composition is an engine oil composition.

25. A method for improving thin film friction in an engine, comprising the step of lubricating the engine with the engine oil composition as claimed in claim 24, wherein the thin film friction is determined by measuring traction coefficients using a mini-traction machine at 130° C. with an applied load of 50N between an ANSI 52100 steel disk and an ANSI 52100 steel ball as oil was being pulled through the contact zone at an entrainment speed of 500 mm/s while maintaining a slide-to-roll ratio of 50% between the ball and disk during the measurements.

26. A method for improving low temperature performance in an engine as determined according to the method of ASTM D5293, comprising the step of lubricating the engine with the engine oil composition as claimed in claim 24.

27. The viscosity index improver of claim 1, wherein the ethylene content of the copolymer of ethylene and one or more $C_3$-$C_{10}$ alpha-olefins is 30 to 70 wt. %.

28. The viscosity index improver of claim 1, wherein the acylated copolymer has a number average molecular weight of greater than 20,000 to 100,000 g/mol as measured by GPC and greater than 6 to 75 moles of acyl groups per mole of polymer chain.

29. The viscosity index improver of claim 1, wherein the ratio of moles of amine per mole of carboxyl groups of the acylated polymer, is from 0.5:1 to 1:1.

\* \* \* \* \*